United States Patent
Bickford et al.

(10) Patent No.: US 8,145,444 B1
(45) Date of Patent: Mar. 27, 2012

(54) ASSET SURVEILLANCE SYSTEM AND METHOD COMPRISING SELF-CALIBRATING FAULT DETECTION

(75) Inventors: Randall L. Bickford, Orangevale, CA (US); Rahul M. Palnitkar, Lincoln, CA (US)

(73) Assignee: Intellectual Assets LLC, Lake Tahoe, NV (US)

( * ) Notice: Subject to any disclaimer, the term of this patent is extended or adjusted under 35 U.S.C. 154(b) by 448 days.

(21) Appl. No.: 12/315,118

(22) Filed: Nov. 28, 2008

Related U.S. Application Data

(60) Provisional application No. 61/005,056, filed on Nov. 30, 2007.

(51) Int. Cl.
  *G01D 18/00* (2006.01)
  *G06F 11/30* (2006.01)

(52) U.S. Cl. ........... 702/85; 702/179; 702/182; 702/183

(58) Field of Classification Search .................... 702/85, 702/179–191
See application file for complete search history.

(56) References Cited

U.S. PATENT DOCUMENTS

| | | | |
|---|---|---|---|
| 6,131,076 A | 10/2000 | Stephan et al. | |
| 6,446,027 B1 | 9/2002 | O'Keeffe et al. | |
| 6,609,036 B1 | 8/2003 | Bickford | |
| 6,892,163 B1 | 5/2005 | Herzog et al. | |
| 6,898,469 B2 | 5/2005 | Bickford | |
| 6,917,839 B2 | 7/2005 | Bickford | |
| 6,975,962 B2 | 12/2005 | Wegerich et al. | |
| 7,039,554 B2 | 5/2006 | Nguyen et al. | |
| 7,082,379 B1 * | 7/2006 | Bickford et al. | 702/178 |
| 7,158,917 B1 | 1/2007 | Bickford | |
| 7,233,886 B2 | 6/2007 | Wegerich et al. | |
| 7,275,018 B2 | 9/2007 | Abu-El-Zeet et al. | |
| 2003/0055607 A1 | 3/2003 | Wegerich et al. | |
| 2005/0007249 A1 * | 1/2005 | Eryurek et al. | 340/511 |
| 2005/0068446 A1 | 3/2005 | Steinberg et al. | |
| 2006/0273896 A1 | 12/2006 | Kates | |
| 2007/0038838 A1 | 2/2007 | Greis et al. | |

OTHER PUBLICATIONS

Chen et al., Failure Detection and Localization in Component Based Systems by Online Tracking, NEC Laboratories America, Inc., 2005.*
S. Zacks, Sequential Testing and Confidence Intervals for the MTBF of Systems having Exponential Distribution of the Interfailure Times, George Washington University, Report No. GWU/IMSE/Serial_T-506/85, 1985.
P.M. Frank, Fault Diagnosis in Dynamic Systems Via State Estimation, University of Duisburg, 1986.
K.C. Gross, et al, Sequential Probability Ratio Test for Nuclear Plant Component Surveillance, Nuclear Technology, vol. 93, p. 131, Feb. 1991.

(Continued)

*Primary Examiner* — Phuong Huynh
(74) *Attorney, Agent, or Firm* — Dennis A. DeBoo

(57) ABSTRACT

A computer-implemented asset surveillance system and method for self calibrating at least one fault detector providing asset surveillance by calibrating at least the one fault detector with statistics associated with expected asset behavior, acquiring observed data values from an asset, screening the observed data values based upon at least one defined criterion for obtaining screened data values, updating the statistics associated with expected asset behavior as a function of the screened data values for defining updated statistics, and recalibrating the at least one fault detector with the updated statistics.

24 Claims, 30 Drawing Sheets

OTHER PUBLICATIONS

Singer, R.M., A Pattern-recognition-based, Fault-tolerant Monitoring and Diagnostic Technique, 7th Symp. on Nuclear Reactor Surveillance, Jun. 1995, Printed in USA by Argonne National Laboratory.

A. Racz, Comments on the Sequential Probability Ratio Testing Methods, Annals of Nuclear Energy, vol. 23, No. 11, pp. 919-934, 1996.

K. Kulacsy, Further Comments on the Sequential Probability Ratio Testing Methods, prepared for Annals of Nuclear Energy by the KFKI Atomic Energy Research Institute, Budapest, Hungary, Report No. KFKI-1996-10/G, 1996.

Bickford, R.L., et al, Real-Time Flight Data Validation for Rocket Engines, AIAA, 1996, Printed in USA by ExperTech & NYMA, Inc.

Wrest, D.J., et al., Instrument Surveillance and Calibration Verification through Plant Wide Monitoring Using Autoassociative Neural Networks, Specialists Meeting on Monitoring and Diagnosis Systems to Improve Nuclear Power Plant Reliability and Safety, May 1996, printed by the International Atomic Energy Agency.

R. M. Singer, et al, Model-Based Nuclear Power Plant Monitoring and Fault Detection: Theoretical Foundations, Proceedings. 9th International Conference on Intelligent Systems Applications to Power Systems, Seoul, Korea, 1997.

K.C. Gross, et al, Application of a Model-based Fault Detection System to Nuclear Plant Signals, Proceedings 9th International Conference on Intelligent Systems Applications to Power Systems, Seoul, Korea, 1997.

Willsky, A.S, A Survey of Design Methods for Failure Detection in Dynamic Systems, Automatica, vol. 12,pp. 601-611, Printed in Great Britan, 1976.

Bickford, R.L., et al, Real-Time Sensor Validation for Autonomous Flight Control, AIAA, Jul. 1997, Printed in USA by Expert Microsystems, Inc. & Intelligent Software Associates, Inc. & Beoing Defense and Space Group.

R. M. Singer, et al, Power Plant Surveillance and Fault Detection: Applications to a Commercial PWR, International Atomic Energy Agency, IAEA-TECDOC-1054, pp. 185-200, Sep. 1997.

K. Kulacsy, Tests of the Bayesian Evaluation of SPRT Outcomes on PAKS NPP Data, KFKI Atomic Energy Research Institute, Budapest, Hungary, Report No. KFKI-1997-07/G, 1997.

J.P. Herzog, et al, Dynamics Sensor Validation for Reusable Launch Vehicle Propulsion, AIAA 98-3604, 34th Joint Propulsion Conference, Cleveland, Ohio, 1998.

Bickford, R.L., et al, Real-Time Sensor Validation for Propulsion Systems, American Institute of Aeronautics and Astronautics, 1998, Printed in USA by Expert Microsystems, Inc. & Dynacs Engineering Co.

Herzog, J.P., et al, MSET Modeling of Crystal River-3 Venturi Flow Meters, 6th International Conference on Nuclear Engineering, 1998, Printed in USA by ASME.

Bickford, R.L., et al, Real-Time Sensor Data Validation for Space Shuttle Main Engine Telemetry Monitoring, AIAA, Jun. 1999, Printed in USA by Expert Microsystems, Inc.& Intelligent Software Associates, Inc. & Dynacs Engineering Company & NASA Glenn Research Center.

K. Yamanishi, J. Takeuchi, and G. Williams. On-line unsupervised outlier detection using finite mixtures with discounting learning algorithms. In Proceedings of the Sixth ACM SIGKDD International Conference on Knowledge Discovery and Data Mining, pp. 320-324, Boston, MA, USA, Aug. 20-23, 2000.

Zavaljevski, N., et al, Support Vector Machines for Nuclear Reactor State Estimation, ANS Topical Mtg. on Advances in Reactor Physics, May 2000, Printed in USA by Argonne National Laboratory.

Wegerich, S., et al, Challenges Facing Equipment Condition Monitoring Systems, MARCOM 2001, May 2001, Printed in USA by SmartSignal Corporation.

Bickford, R.L., et al, Online Signal Validation for Assured Data Integrity, 47th International Instrumentation Symposium, May 2001, Printed in USA by Expert Microsystems, Inc., and NASA Glenn Research Center.

Litt, J.S et al, A Survey of Intelligent Control and Health Management Technologies for Aircraft Propulsion Systems, NASA Glenn Research Center, Report No. NASA/TM-2005-213622, May 2005.

Bickford, R.L., et al, Ground Test Facility Implementation of a Real-Time Turbine Engine Diagnostic System, American Institute of Aeronautics and Astronautics (AIAA), 41$^{st}$ Joint Propulsion Conference, Jul. 2005, Printed in USA by AIAA.

Spitzlsperger, G., et all, Fault Detection for a Etch Process Using Adaptive Multivariate Methods, In IEEE Transactions on Semiconductor Manufacturing, vol. 18, No. 4, Nov. 2005.

Bickford, R.L., et all, Ground Test Data Validation Using a Subscale F/A-22 Engine Inlet Empirical Model,In Proceedings of GT2006, ASME Turbo Expo 2006: Power, for Land, Sea, and Air, May 2006, Barcelona, Spain.

\* cited by examiner

|           | Training Data | Aging Data | Slow Failure Data |
|-----------|---------------|------------|-------------------|
| Num Obs   | 79365         | 79365      | 79365             |
| Min Value | 1.8840        | 1.8761     | 1.7815            |
| Max Value | 1.9030        | 1.9016     | 1.8923            |
| Mean      | 1.8928        | 1.8880     | 1.8373            |
| Std Dev   | 2.547E-03     | 4.411E-03  | 2.94E-02          |

FIG. 18

| ASP Mean Usage | Decay Factor |
|---|---|
| Fault Detector | 0.00001 |
| Data Screener | 0.000001 |

FIG. 21

| Fault Detector | False Alarms | % Improvement |
|---|---|---|
| Static ASP | 21,609 | - |
| Self-Calibrating ASP | 189 | 99.13% |

FIG. 22

| Fault Detector | % Failures Reported |
|---|---|
| Static ASP | 75.34 |
| Self-Calibrating ASP | 95.24 |

FIG. 28

| Screening Method | Aging Data Rejected | Slow Failure Data Rejected |
|---|---|---|
| Self-Calibrating ASP | 29.5% | 98.64% |

FIG. 29

| Fault Detector Type | Time of Failure Detection (GMT) |
|---|---|
| Static ASP | 1046098190 |
| Self-Calibrating ASP | 1045759429 |

FIG. 30

```
┌─────────────────────────────────────────────────────────────────────┐
│ A computer-implemented method for self calibrating at least one fault detector │
│ monitoring an asset, comprising the steps of:                       │
└─────────────────────────────────────────────────────────────────────┘
                                    │
┌─────────────────────────────────────────────────────────────────────┐
│ Calibrating at least one fault detector with statistics associated with expected │
│ asset behavior;                                                     │
└─────────────────────────────────────────────────────────────────────┘
                                    │
┌─────────────────────────────────────────────────────────────────────┐
│ Acquiring observed data values from an asset;                       │
└─────────────────────────────────────────────────────────────────────┘
                                    │
┌─────────────────────────────────────────────────────────────────────┐
│ Screening the observed data values based upon at least one defined criterion │
│ for obtaining screened data values;                                 │
└─────────────────────────────────────────────────────────────────────┘
                                    │
┌─────────────────────────────────────────────────────────────────────┐
│ Updating the statistics associated with expected asset behavior as a function │
│ of the screened data values for defining updated statistic; and     │
└─────────────────────────────────────────────────────────────────────┘
                                    │
┌─────────────────────────────────────────────────────────────────────┐
│ Recalibrating the at least one fault detector with the updated statistics. │
└─────────────────────────────────────────────────────────────────────┘
```

FIG. 33

ASSET SURVEILLANCE SYSTEM AND METHOD COMPRISING SELF-CALIBRATING FAULT DETECTION

CROSS-REFERENCE TO RELATED APPLICATIONS

This application claims priority under 35 USC Section 119(e) to co-pending U.S. Provisional Patent Application No. 61/005,056, filed Nov. 30, 2007, the entire disclosure of which is incorporated herein by reference.

STATEMENT REGARDING FEDERALLY SPONSORED RESEARCH AND DEVELOPMENT

This invention was made with Government support under Small Business Innovation Research (SBIR) Contract No. N68335-06-C-0081 awarded by the United States Navy and is subject to the provisions of Public Law 96-517 (35 USC 202) and the Code of Federal Regulations 48 CFR 52.227-11, in which the contractor has elected to retain title. The Government has certain rights in the invention.

FIELD OF THE INVENTION

This invention relates generally to asset surveillance systems and methods and, in particular, to an asset surveillance system and method comprising self-calibrating fault detection.

BACKGROUND OF THE INVENTION

Products useful for determining or monitoring the condition of productive assets, including but not limited to equipment and processes, most often perform this surveillance function by evaluating signal or data values obtained during asset operation. One means for determining or monitoring the condition of an asset involves estimating the expected data values and comparing the estimated values to current data values obtained from the asset. When the estimated data values characterize the desired or expected operation of the asset, a disagreement between the estimated data values and the current data values provides a sensitive and reliable indication of an asset fault condition and can further provide an indication of the particular cause of the asset fault. The disagreement between each estimated data value and each current data value can be computed as the numerical difference between them. This difference is often referred to as a residual data value. The residual data values, the current data values, or the estimated data values can be used to determine condition of the asset and to identify asset faults. We will hence forth refer to techniques used to identify asset faults as fault detectors.

Assets age with time. The current data values, estimated data values, and residual data values often change over time as the result of asset aging. Unfortunately, typical fault detectors used today are static and do not adjust or recalibrate automatically over the life cycle of the asset. This can result in false alarms using static fault detectors as the asset ages. To prevent such false alarms, it is often necessary to reduce the sensitivity of the fault detector to accommodate the aging behavior of the asset. Unfortunately, this results in increased numbers of missed alarms during slow failure of the asset and delays fault identification and correction.

In the alternative, the operators of the asset might manually recalibrate the fault detectors periodically to maintain adequate sensitivity. This is undesirable since manual recalibration of fault detectors might not be practical for assets deployed in-service. For most types of fault detectors, manual recalibration might additionally require temporary suspension of the asset monitoring process.

For the foregoing reasons, there is a need for an asset surveillance system and method that overcomes the significant shortcomings of the known prior-art as delineated hereinabove.

BRIEF SUMMARY OF THE INVENTION

Accordingly, and in one aspect, an embodiment of the invention provides a novel, useful, and non-obvious asset surveillance system and method comprising self-calibrating fault detection.

In another aspect, an embodiment of the invention provides an asset surveillance system and method that automatically calibrates at least one fault detector used for monitoring an aging asset.

In another aspect, an embodiment of the invention provides an asset surveillance system and method that ensures that normal aging data is used for calibration while simultaneously ensuring that data representing accelerated aging or failure of an asset is excluded from use for calibration.

In another aspect, an embodiment of the invention provides an asset surveillance system and method that achieves a more optimal trade-off between low false alarms and low missed alarms that, in turn, provides higher fault identification accuracy for an asset surveillance system.

In another aspect, an embodiment of the invention provides an asset surveillance system and method that is suitable for use where the fault detectors need to be calibrated dynamically with the asset data without manual intervention.

In another aspect, an embodiment of the invention provides an asset surveillance system and method that is suitable for use in resource constrained computational environments, such as on-board computing systems often used in military or aerospace assets.

In another aspect, an embodiment of the invention provides an asset surveillance system and method that is suitable for a variety of statistical fault detector types that use the asset data statistics, specifically moments or parameters derived from the asset data statistics, for fault detection.

In another aspect, an embodiment of the invention provides an asset surveillance system and method that includes a sequential discounting expectation maximization method for fault detector self-calibration.

In a further aspect, an embodiment of the invention provides a computer-implemented method for self calibrating at least one fault detector monitoring an asset, comprising the steps of: calibrating at least one fault detector with statistics associated with expected asset behavior; acquiring observed data values from an asset; screening the observed data values based upon at least one defined criterion for obtaining screened data values; updating the statistics associated with expected asset behavior as a function of the screened data values for defining updated statistics; and recalibrating the at least one fault detector with the updated statistics. Additionally, and in one embodiment, the updating step comprises a step of utilizing a sequential discounting expectation maximization method. Furthermore, an embodiment of the invention provides a computer-readable medium having computer executable instructions recorded thereon which causes, in use, a computer running the instructions to execute a procedure according to the above computer-implemented method.

In another further aspect, an embodiment of the invention provides an asset surveillance system comprising self-calibrating fault detection, said system comprising: at least one fault detector calibrated with statistics associated with expected asset behavior; means for acquiring observed data values from an asset; means for screening the observed data values based upon at least one defined criterion for obtaining screened data values; means for updating the statistics associated with expected asset behavior as a function of the screened data values for defining updated statistics; and means for recalibrating the at least one fault detector with the updated statistics.

Accordingly, it should be apparent that numerous modifications and adaptations may be resorted to without departing from the scope and fair meaning of the claims as set forth herein below following the detailed description of the invention.

BRIEF DESCRIPTION OF THE DRAWINGS

FIG. 18 lists statistical properties of the training, aging, and slow failure power supply voltage data.

FIG. 21 lists decay factor values for data screeners and fault detectors in an embodiment of the asset surveillance system and method comprising self-calibrating fault detection employed to accomplish fault detection for a power supply asset.

FIG. 22 lists values comparing false alarm results for the power supply asset surveillance performed using static adaptive sequential probability (ASP) mean fault detectors and using an embodiment of the asset surveillance system and method comprising self-calibrating ASP mean fault detectors and data screeners.

FIG. 28 lists percentage values of failures reported for the slow failure data.

FIG. 29 lists percentage values of aging data and slow failure data rejected by data screeners.

FIG. 30 lists values of time of failure detection for slow failure data.

FIG. 33 is a general flowchart view of an embodiment of a computer-implemented method for self calibrating at least one fault detector monitoring an asset.

DETAILED DESCRIPTION OF THE INVENTION

Figure 1:
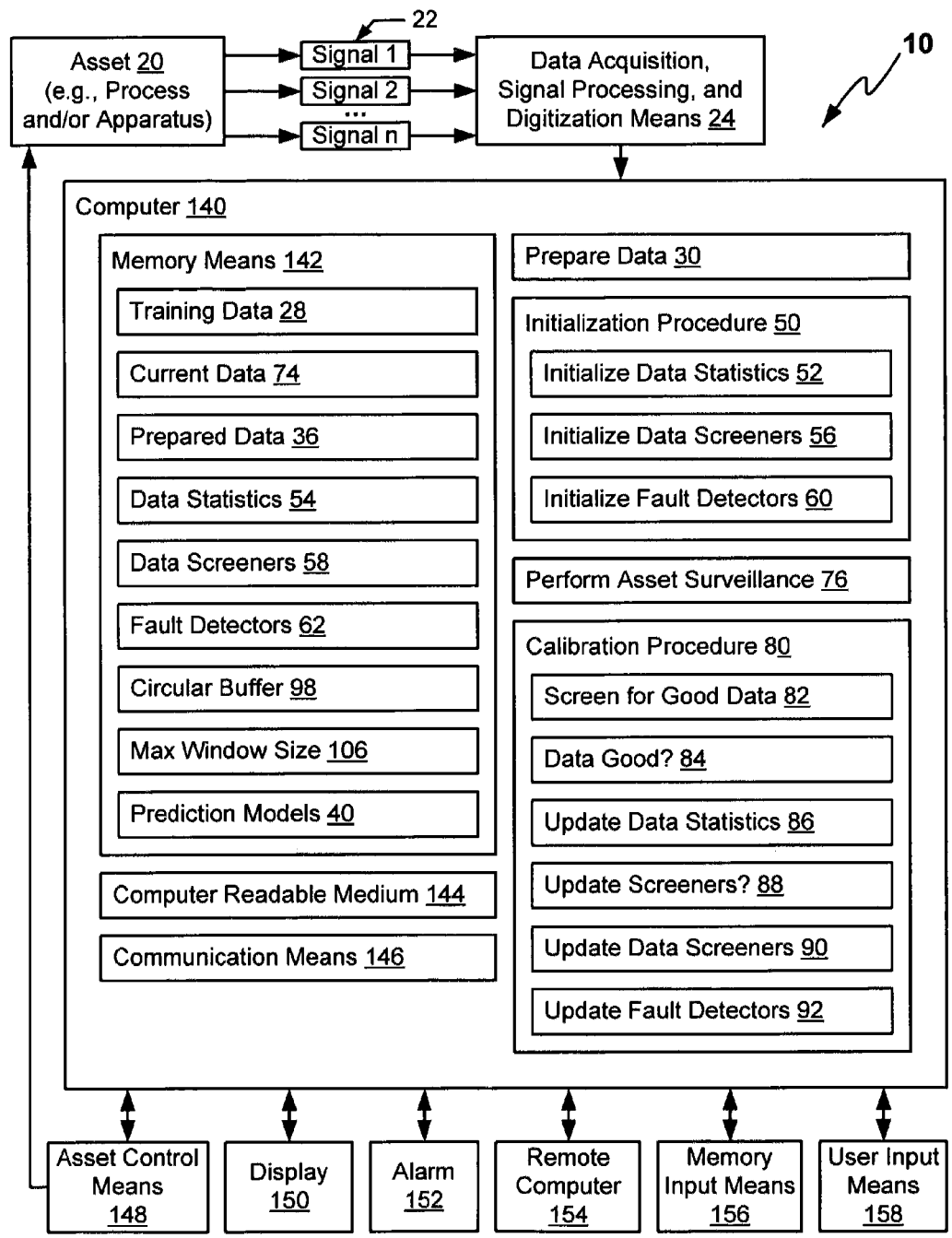
FIG. 1 is a functional block diagram of an embodiment of an asset surveillance system and method comprising self-calibrating fault detection.

Considering the drawings, wherein like reference numerals denote like parts throughout the various drawing figures, reference numeral 10 is directed to an asset surveillance system and method comprising self-calibrating fault detection.

Referring to FIG. 1, and in one embodiment, the asset surveillance system and method comprising self-calibrating fault detection 10 is comprised of an initialization procedure 50 for initializing at least one fault detector and a calibration procedure 80 for calibrating dynamically said at least one fault detector, which initialization and calibration procedures are performed in combination with a perform asset surveillance procedure 76 for determining the status of an asset 20, for example but not by limitation a process or apparatus. Data from one or more signals or data sources 22 correlative to the status of the asset 20 is acquired for example using a data acquisition and digitization means 24 and is used in the performance of the initialization, calibration and surveillance procedures, which acquired data might be further prepared for use by a variety of methods using a prepare data procedure 30.

Additionally, and in one embodiment, the asset surveillance system and method comprising self-calibrating fault detection 10 is accomplished by a computer-implemented method for calibrating dynamically at least one fault detector 62 used to detect faulty, degraded, or erroneous operation or behavior of the asset 20. Said computer-implemented method is performed on a computer 140 having a memory means 142 and having instructions for the asset surveillance system and method 10 stored on and/or retrievable from a computer readable medium 144. Generally, any type of computer readable medium 144 might be employed and examples include floppy disks, hard disks, CD-ROMS, Flash ROMS, nonvolatile ROM, and RAM. Additionally, the memory means 142 might be employed for the computer readable medium 144. The results of operating the instructions for the asset surveillance system and method 10 on the computer 140 can be provided using a communications means 146. By way of example and not by limitation the results of operating said instructions can be communicated by the computer 140 to an asset control means 148, a display 150, an alarm 152, or to a remote computer 154.

Furthermore, one embodiment of the invention provides an asset surveillance system and method comprising self-calibrating fault detection 10 used in combination with a computer 140 and a memory means 142 for the identification of faults indicated in the current data values for the one or more signals or data sources 22 from at least one asset 20. The asset surveillance system and method 10 employs fault detectors 62 that operate on prepared data values 36 that are acquired data values and/or are values derived from acquired data values using calculation or transformation by the prepare data procedure 30. Data values might be acquired using any suitable means including by way of example and not by limitation data values acquired: using a data acquisition and digitization means 24 electrically coupled between the computer 140 and the asset 20; or by memory means 142 of the computer 140 via, for example, user input means 158, memory input means 156, and/or remote computer means 154. Fault detectors 62 use data statistics 54 computed from the prepared data values 36 and/or parameters derived from said computed data statistics 54 in performing fault detection for performing asset surveillance 76.

Figure 2:
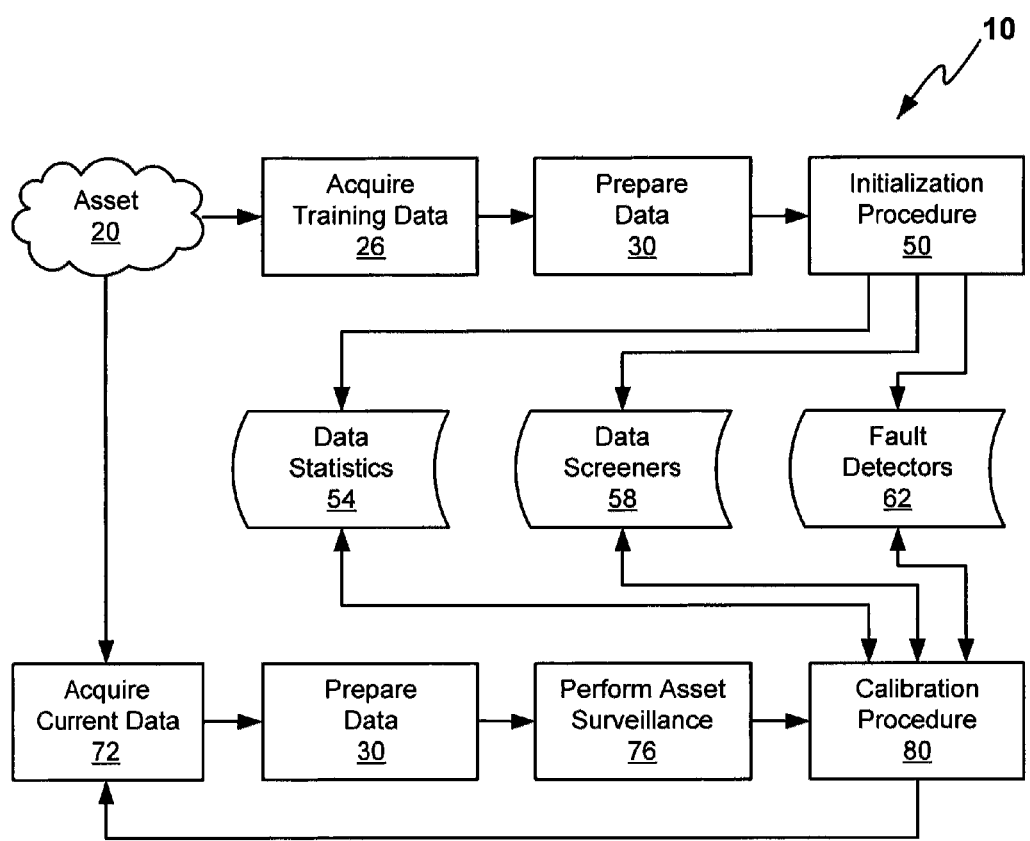
FIG. 2 is a functional flow diagram of an embodiment of an asset surveillance system and method comprising self-calibrating fault detection.
Figure 3:
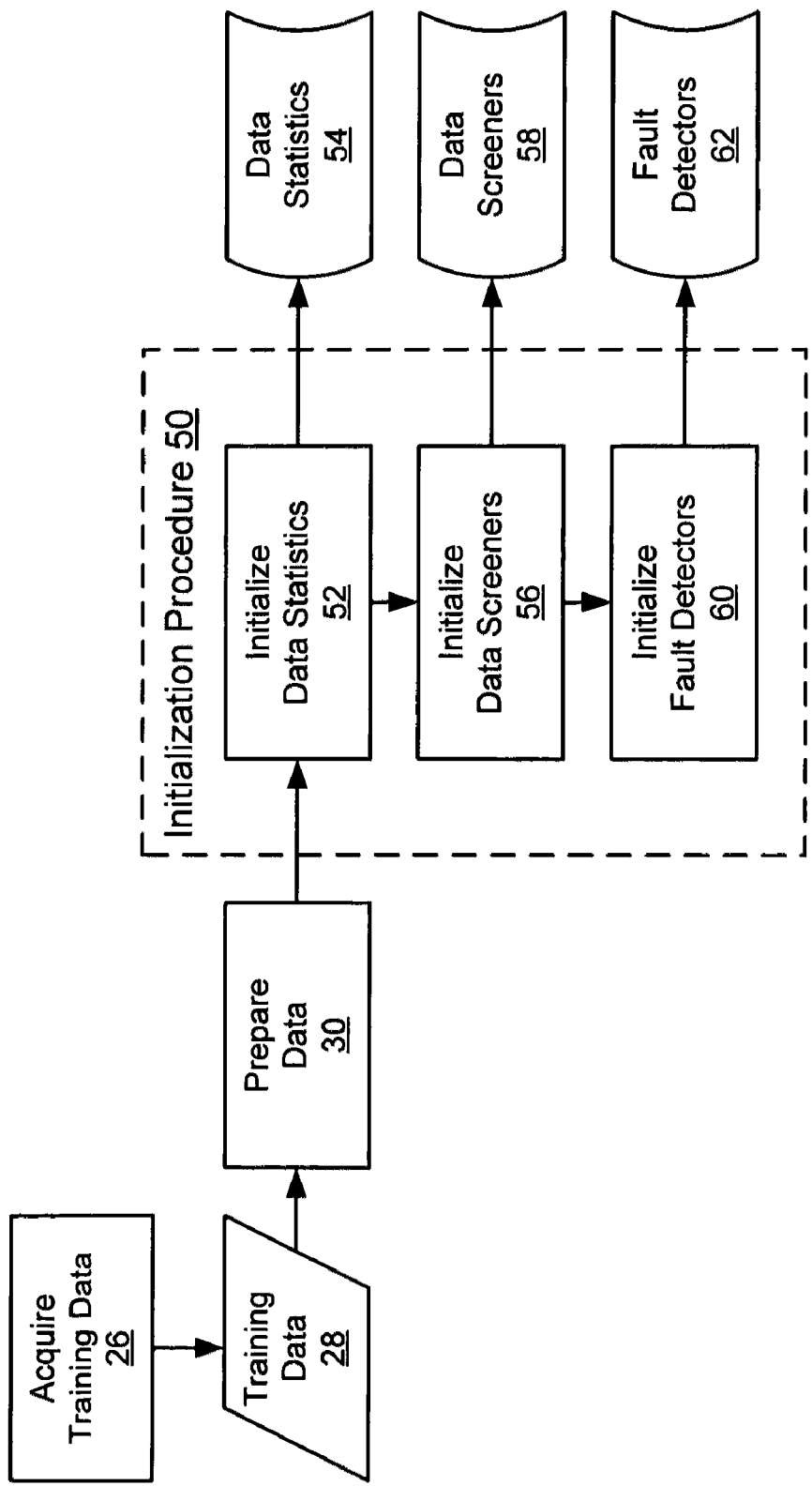
FIG. 3 is a functional flow diagram detailing an embodiment of an initialization procedure of an asset surveillance system and method comprising self-calibrating fault detection.
Figure 4:
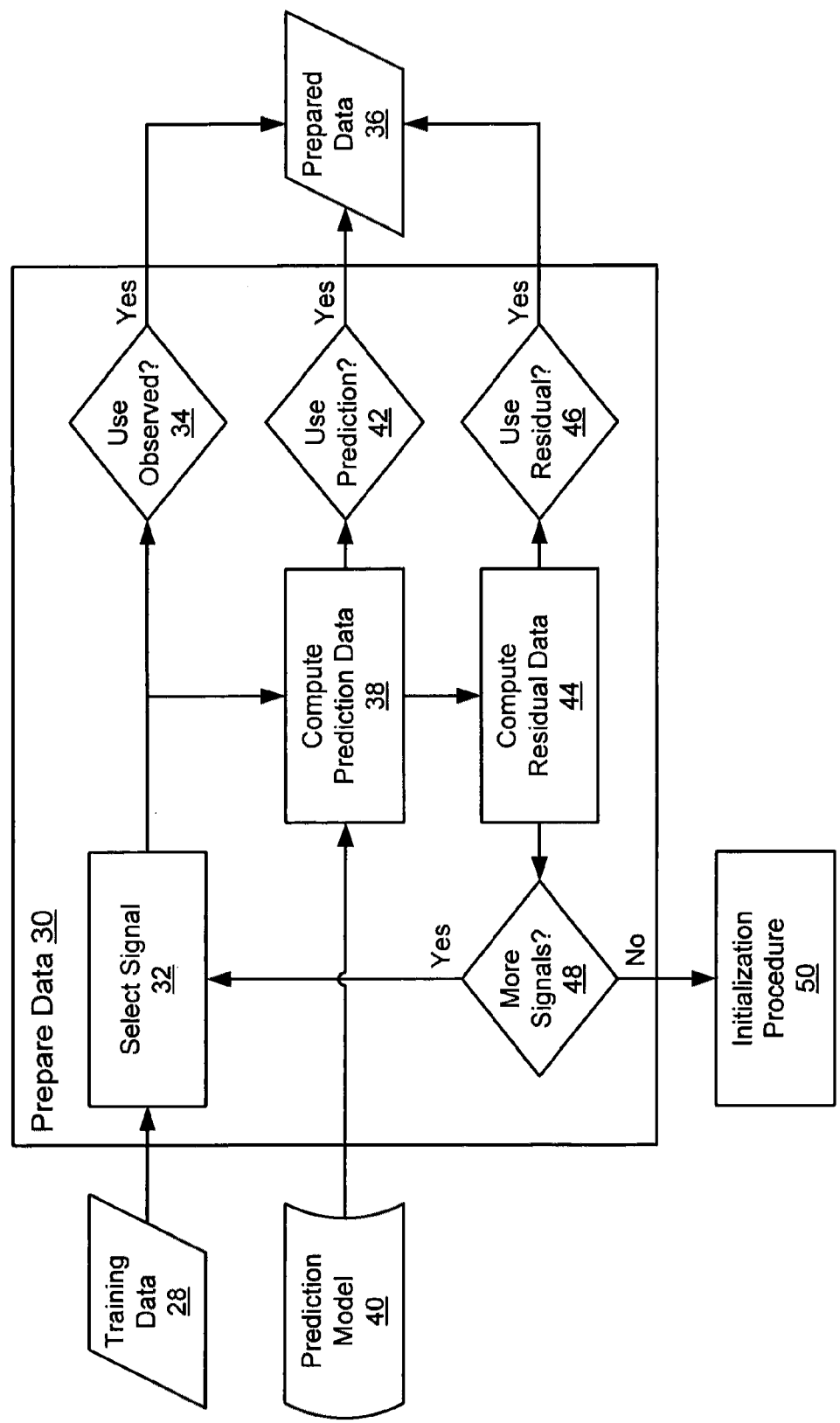
FIG. 4 is a functional flow diagram further detailing a prepare data procedure for an embodiment of an initialization procedure of an asset surveillance system and method comprising self-calibrating fault detection.
Figure 5:
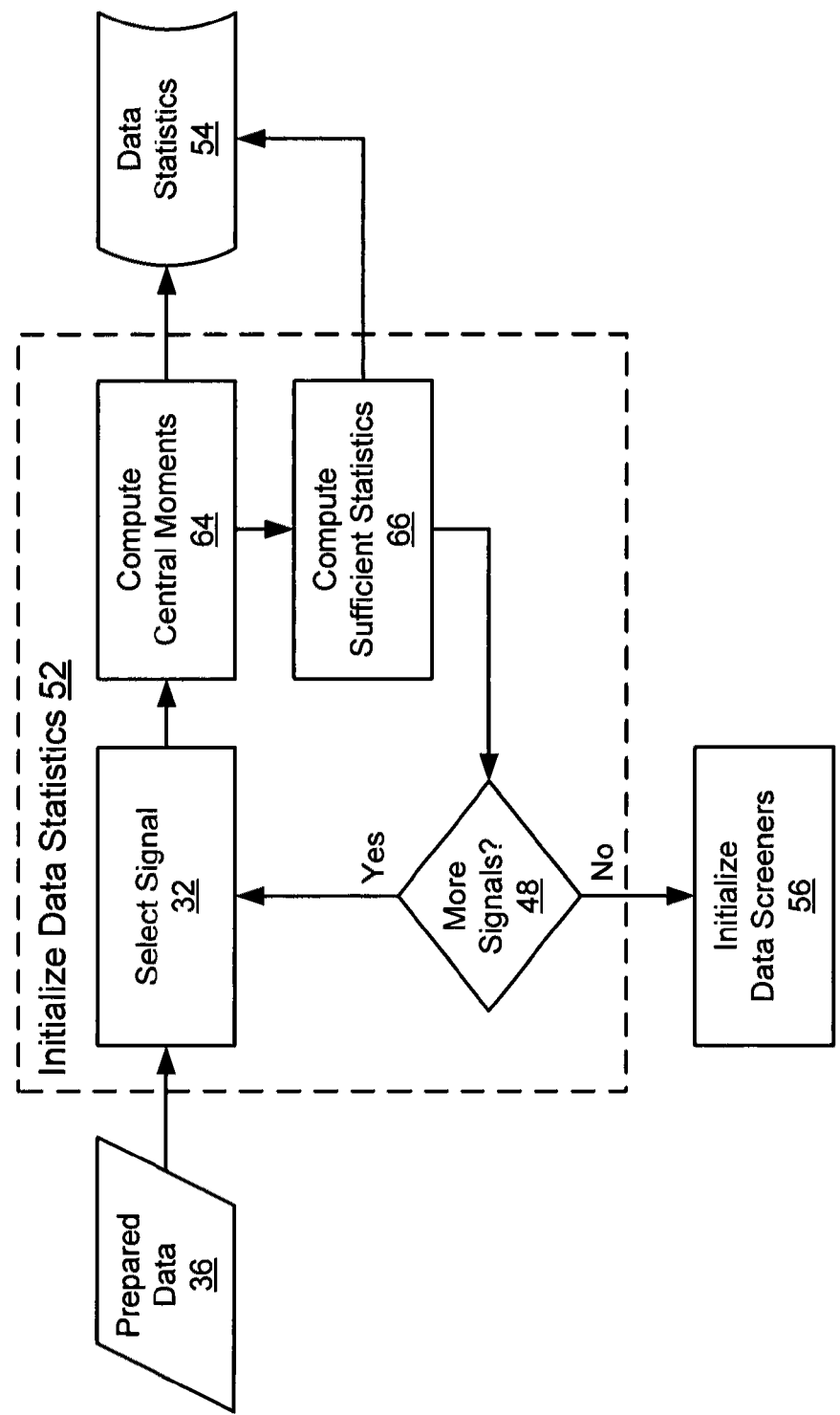
FIG. 5 is a functional flow diagram further detailing an initialize data statistics procedure for an embodiment of an initialization procedure of an asset surveillance system and method comprising self-calibrating fault detection.
Figure 6:
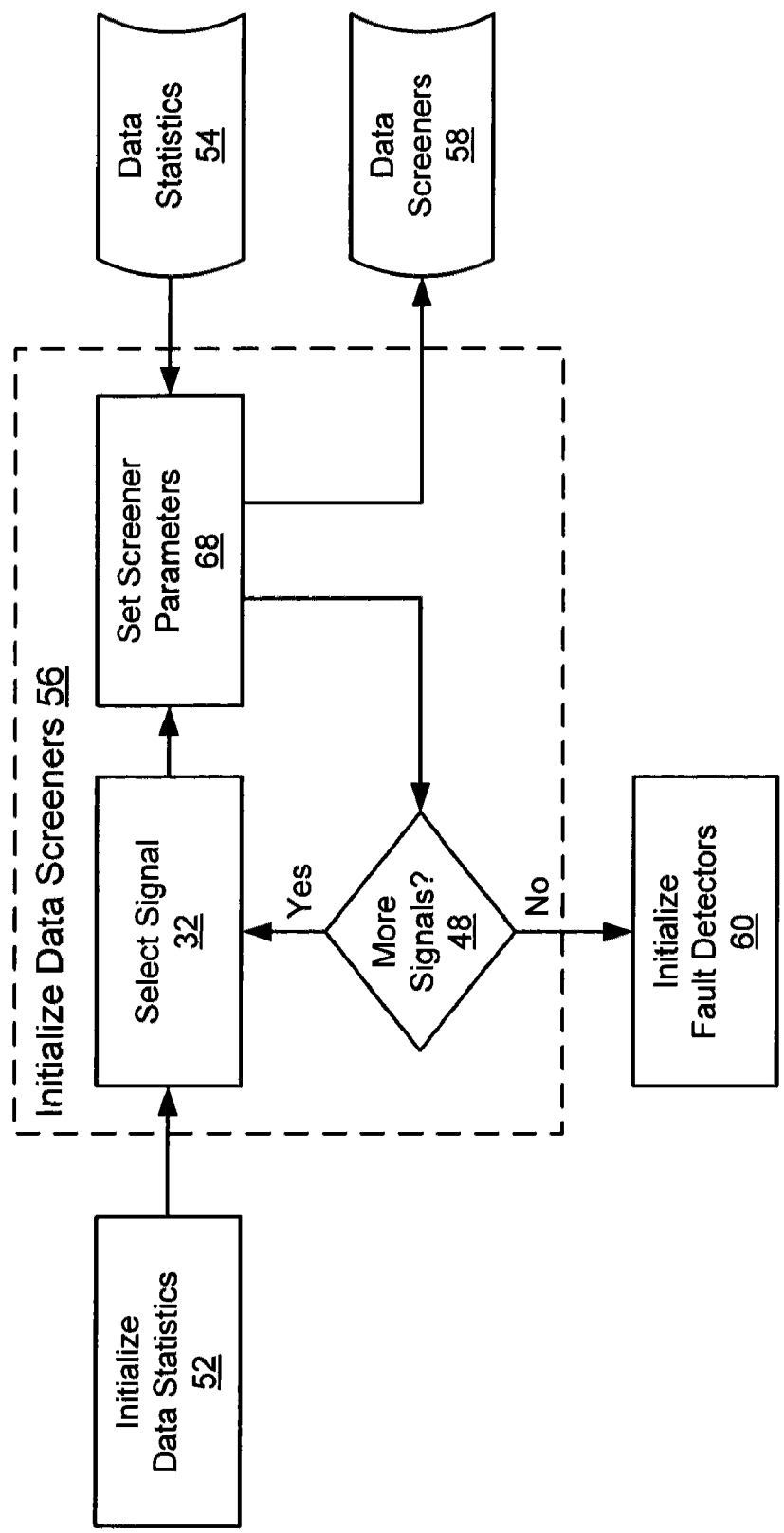
FIG. 6 is a functional flow diagram further detailing an initialize data screeners procedure for an embodiment of an initialization procedure of an asset surveillance system and method comprising self-calibrating fault detection.
Figure 7:
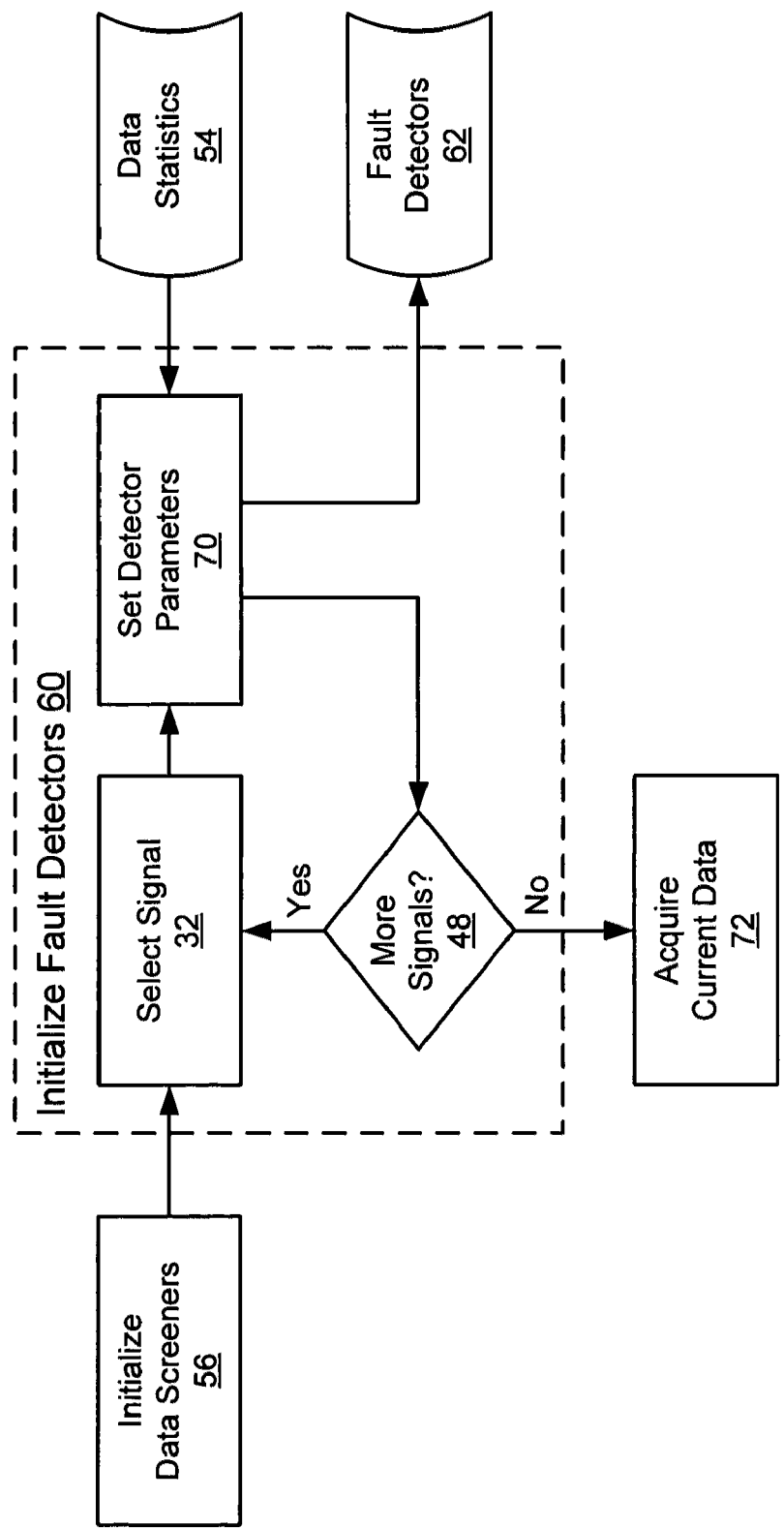
FIG. 7 is a functional flow diagram further detailing an initialize fault detectors procedure for an embodiment of an initialization procedure of an asset surveillance system and method comprising self-calibrating fault detection.
Figure 8:
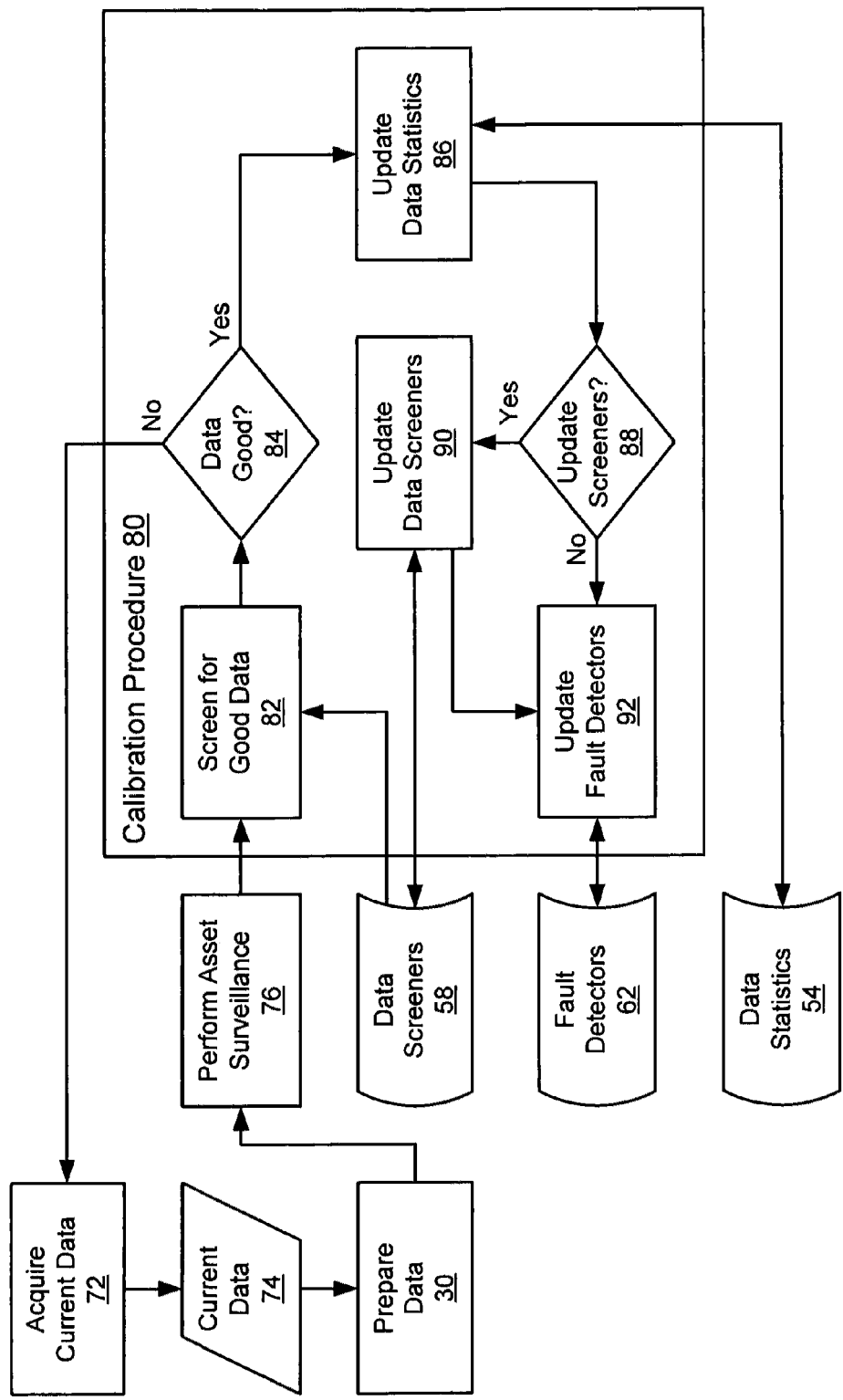
FIG. 8 is a functional flow diagram detailing an embodiment of a calibration procedure of an asset surveillance system and method comprising self-calibrating fault detection.
Figure 9:
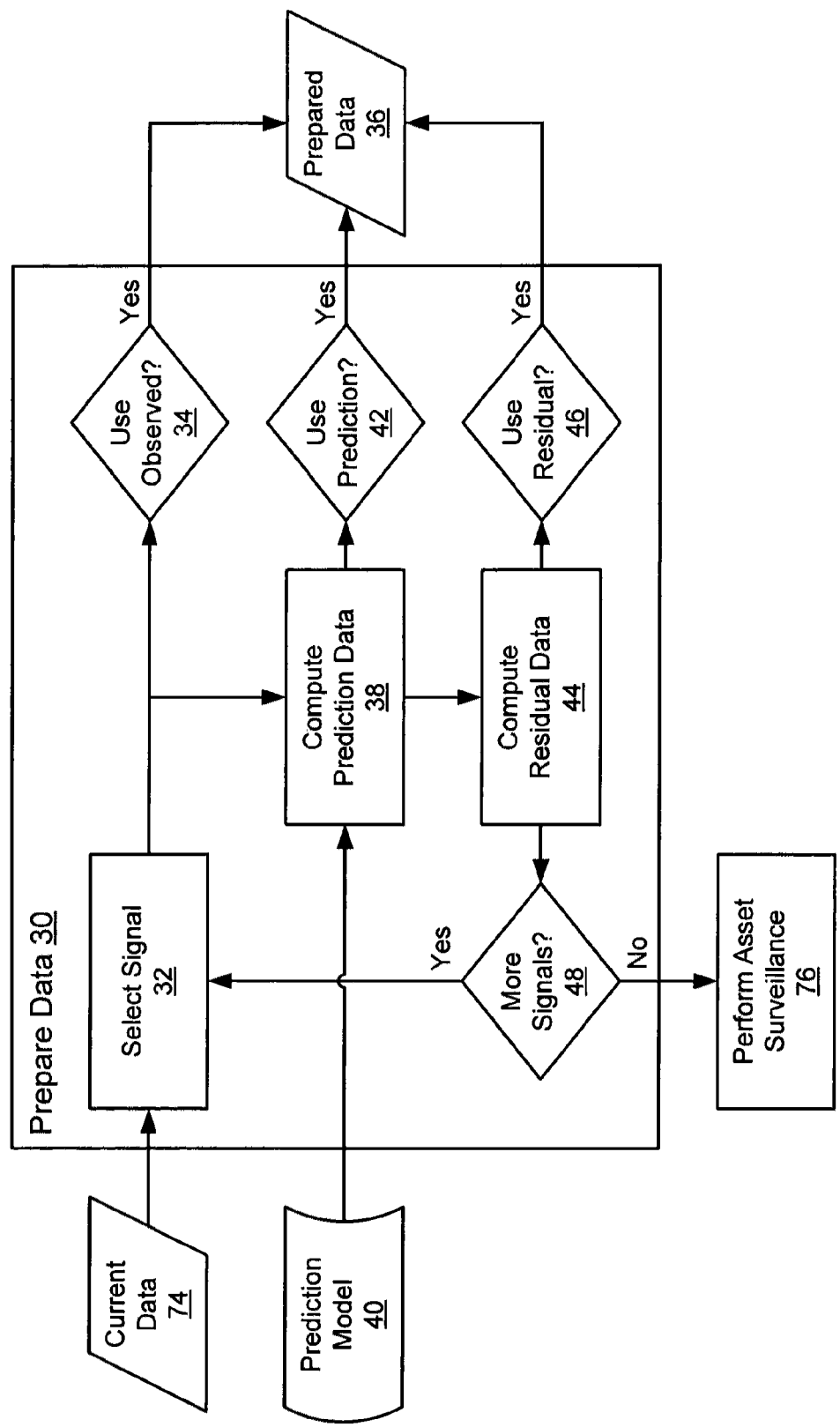
FIG. 9 is a functional flow diagram further detailing a prepare data procedure for an embodiment of a calibration procedure of an asset surveillance system and method comprising self-calibrating fault detection.
Figure 10:
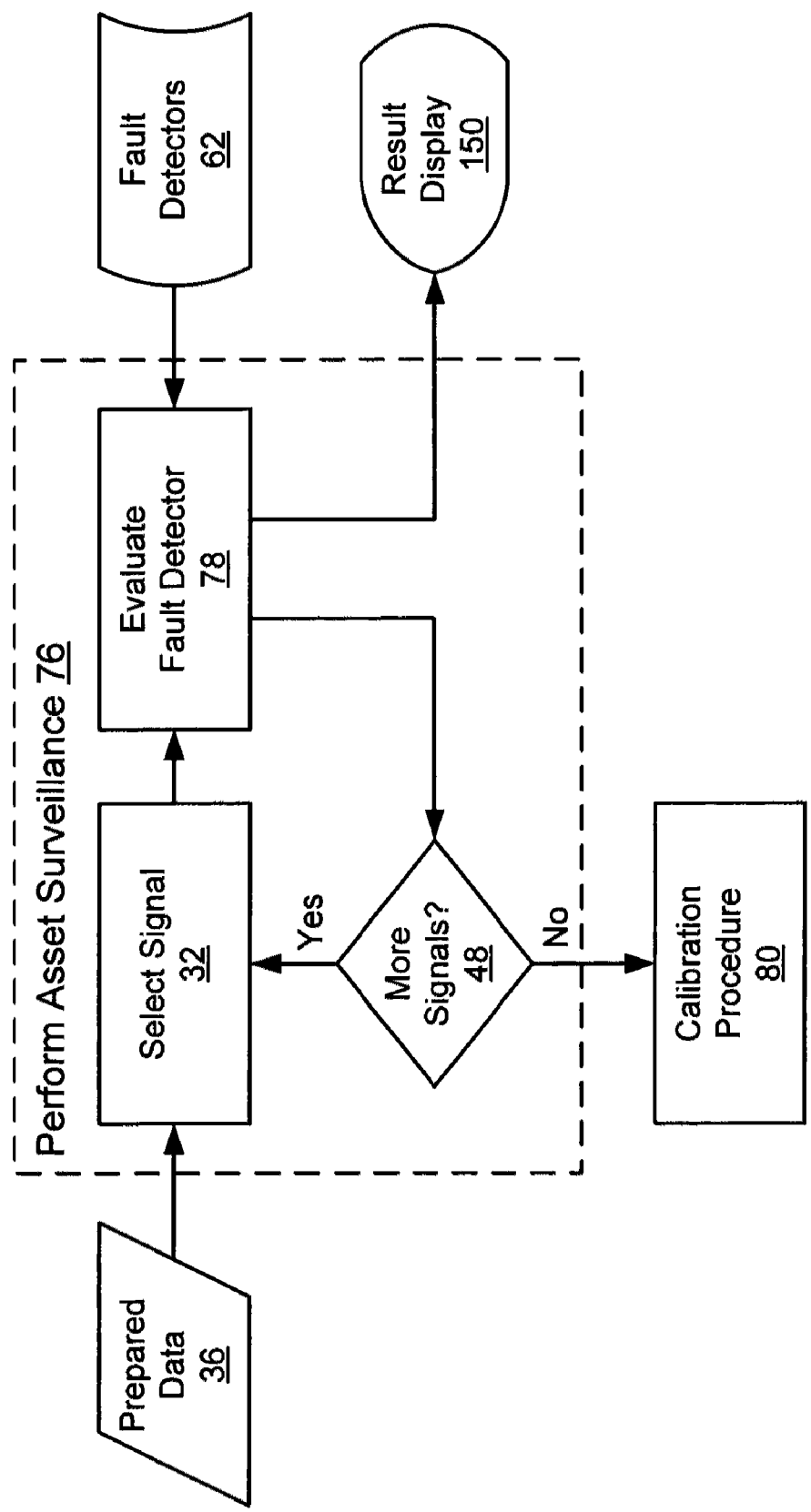
FIG. 10 is a functional flow diagram detailing an embodiment of a perform asset surveillance procedure of an asset surveillance system and method comprising self-calibrating fault detection.
Figure 11:
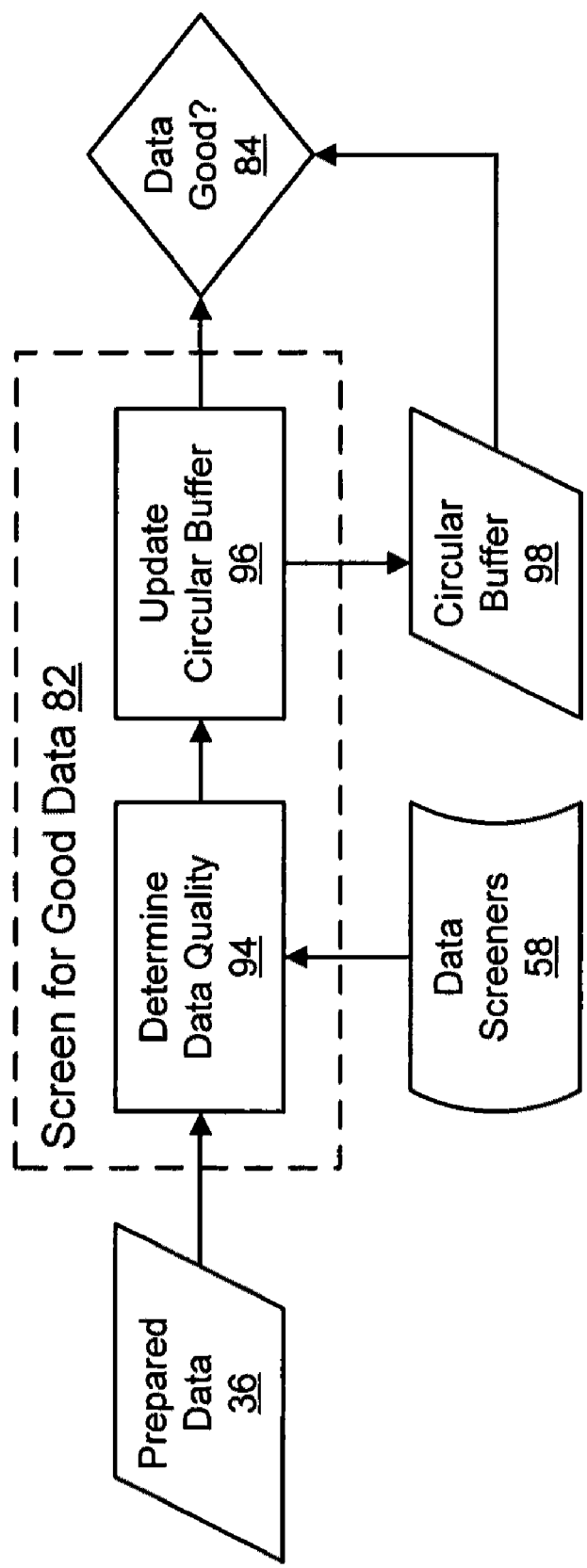
FIG. 11 is a functional flow diagram further detailing a screen for good data procedure for an embodiment of a calibration procedure of an asset surveillance system and method comprising self-calibrating fault detection.
Figure 12:
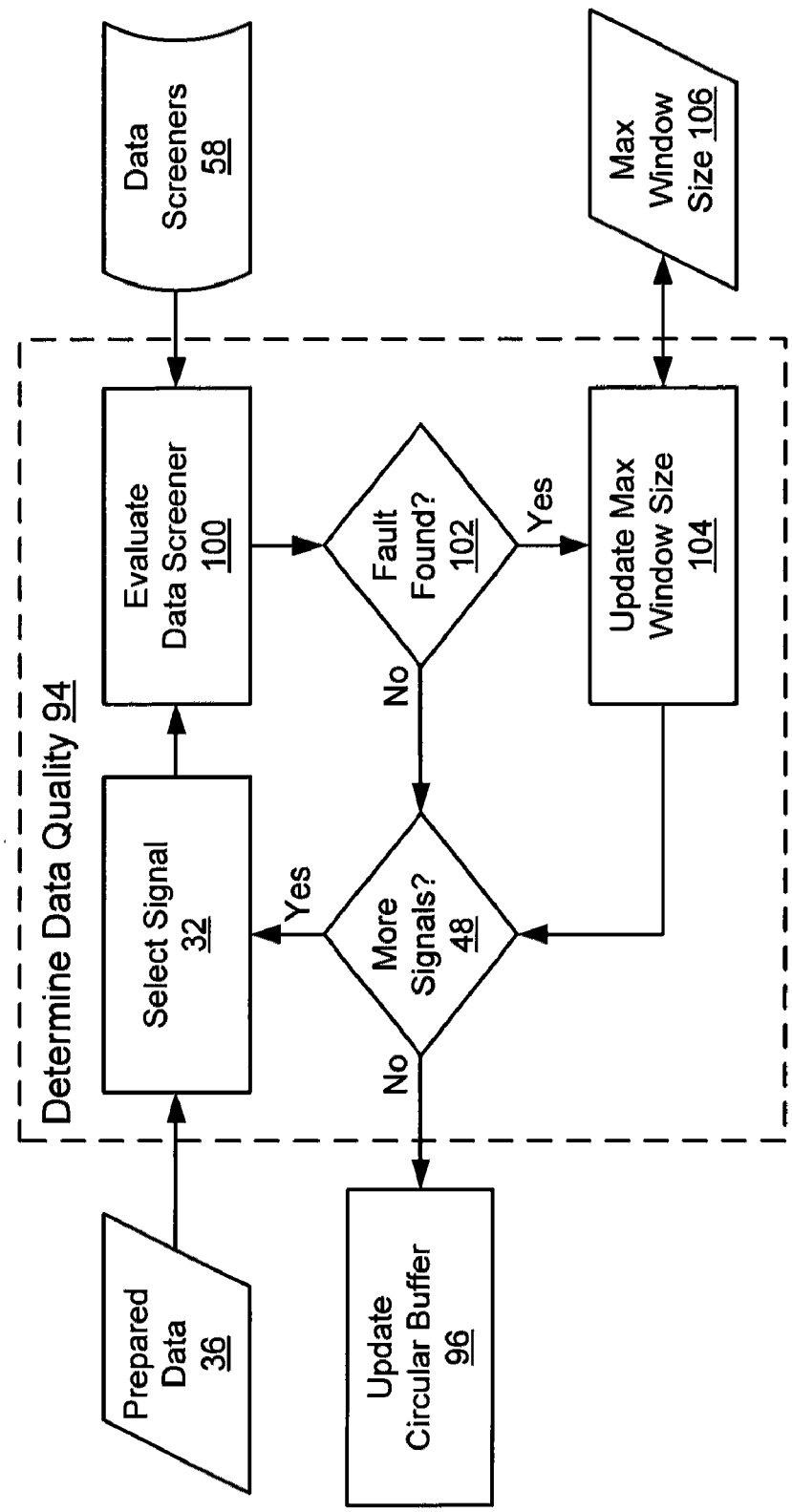
FIG. 12 is a functional flow diagram further detailing a determine data quality procedure for an embodiment of a calibration procedure of an asset surveillance system and method comprising self-calibrating fault detection.
Figure 13:
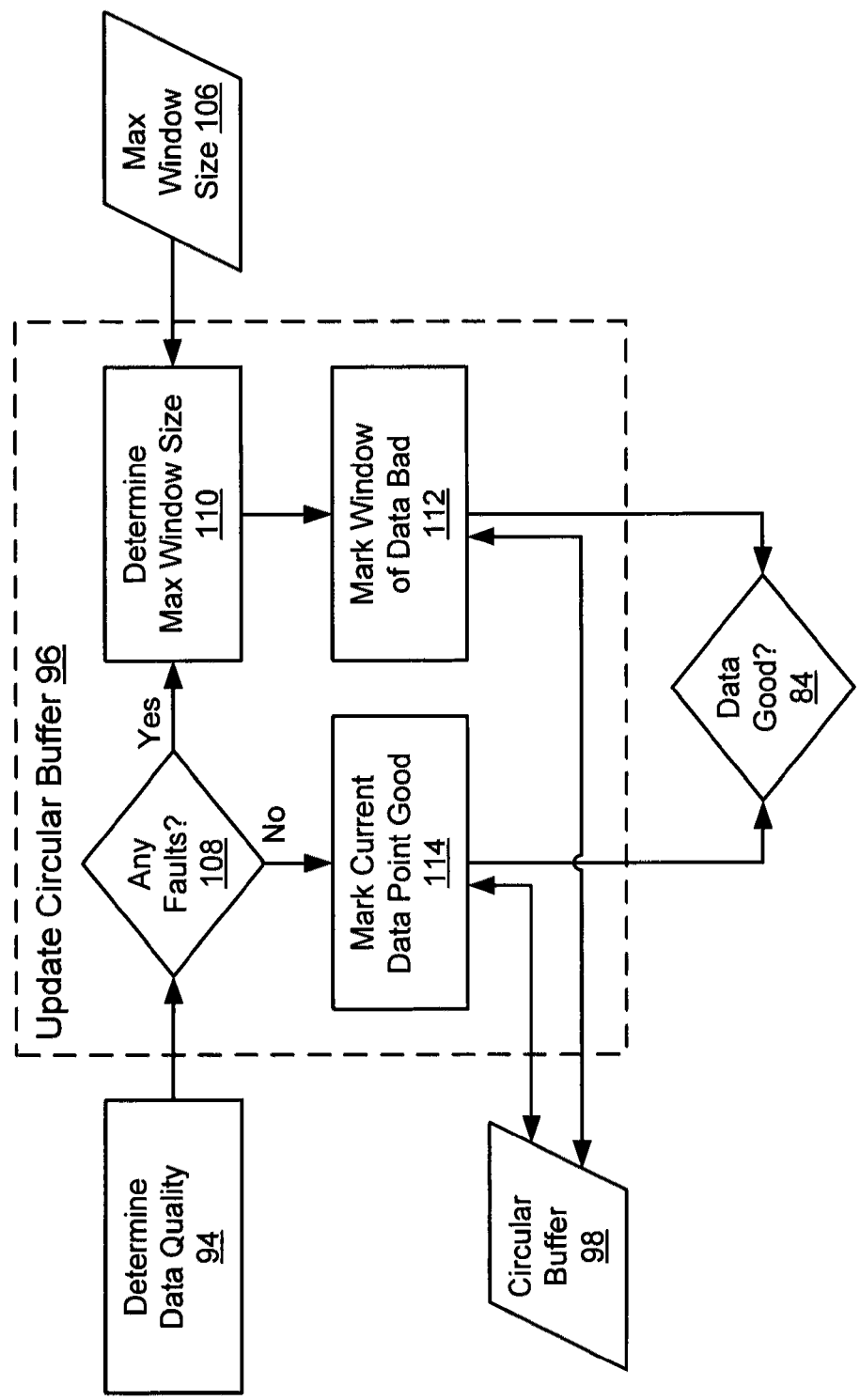
FIG. 13 is a functional flow diagram further detailing an update circular buffer procedure for an embodiment of a calibration procedure of an asset surveillance system and method comprising self-calibrating fault detection.
Figure 14:
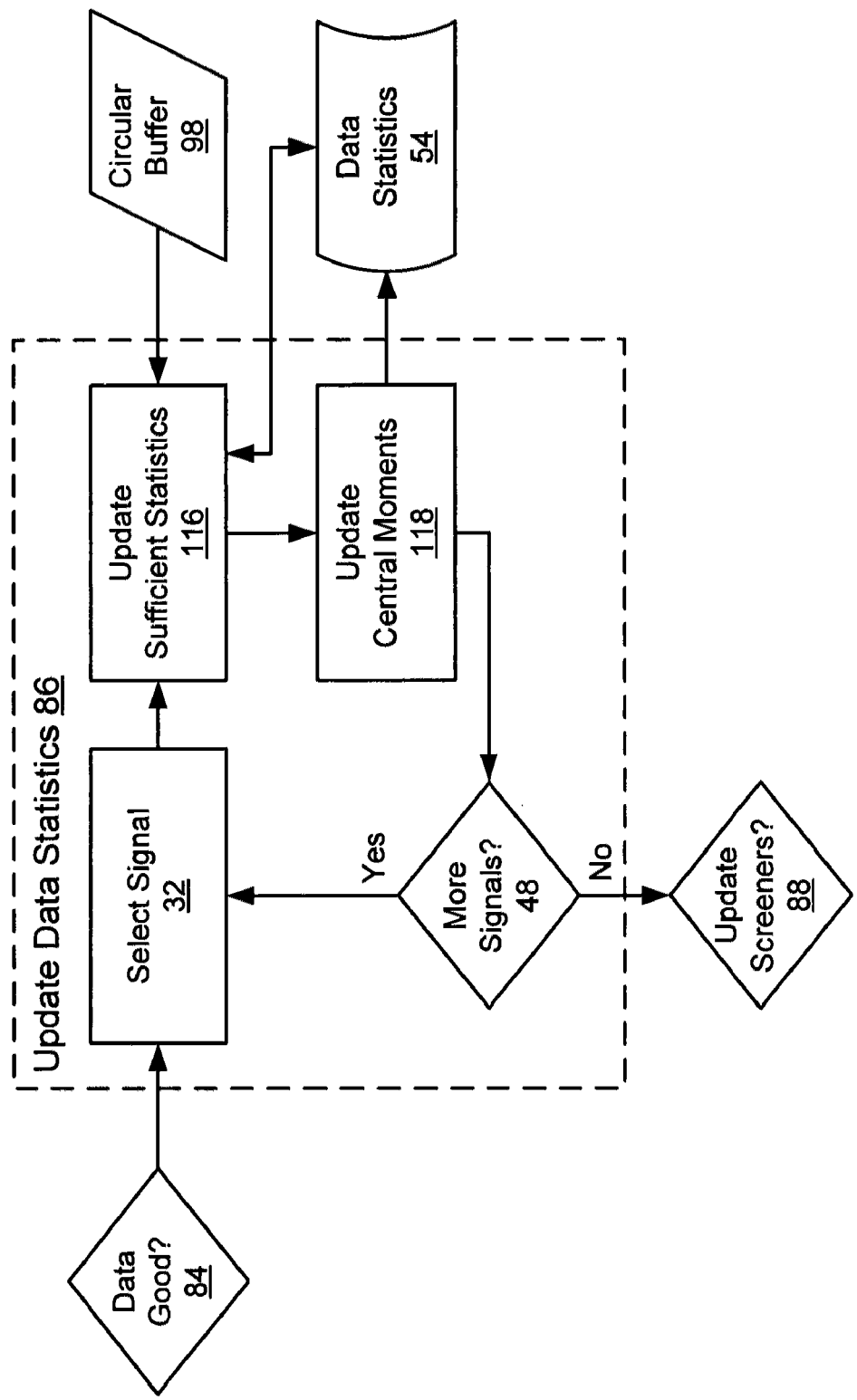
FIG. 14 is a functional flow diagram further detailing an update data statistics procedure for an embodiment of a calibration procedure of an asset surveillance system and method comprising self-calibrating fault detection.
Figure 15:
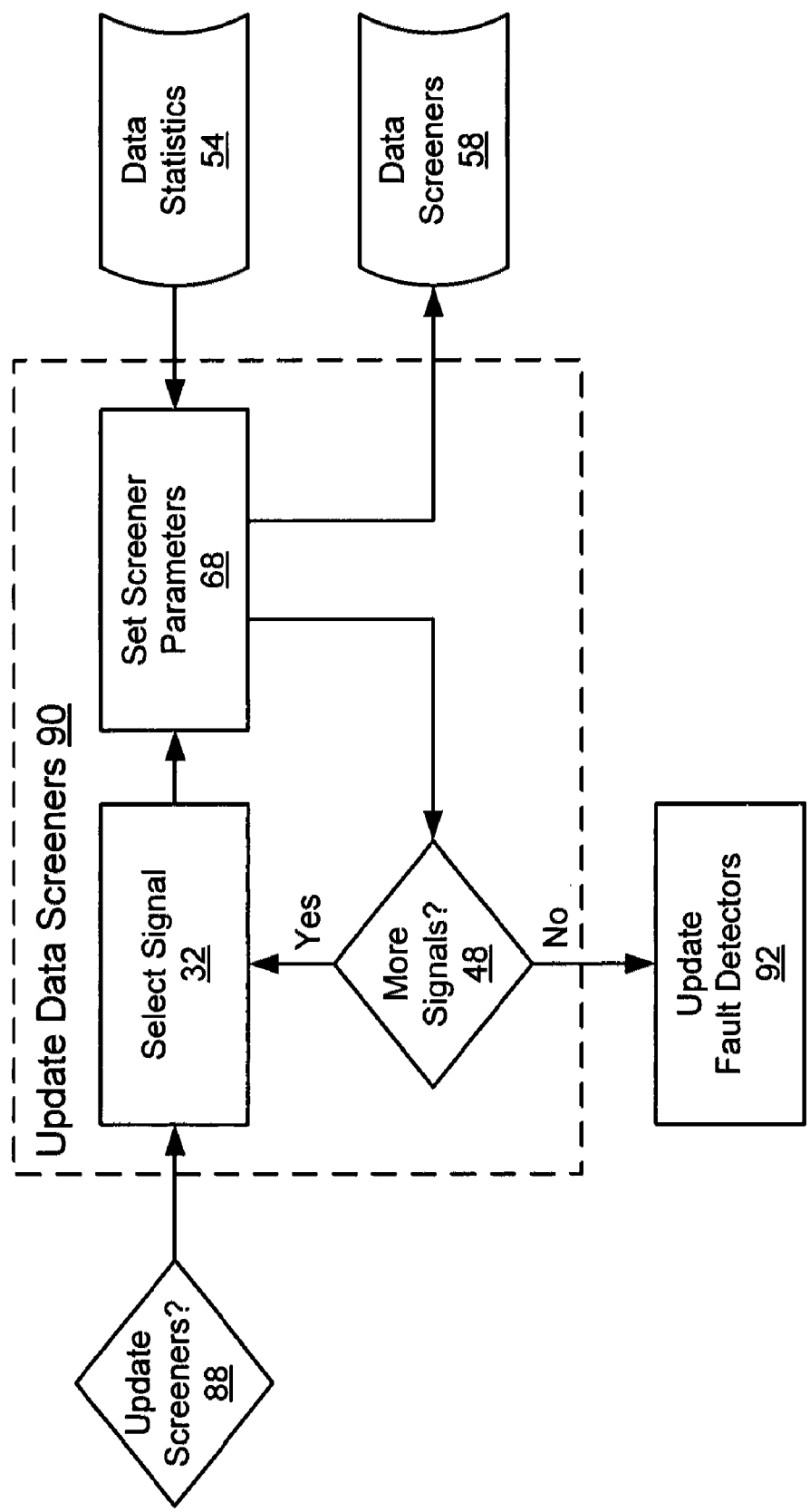
FIG. 15 is a functional flow diagram further detailing an update data screeners procedure for an embodiment of a calibration procedure of an asset surveillance system and method comprising self-calibrating fault detection.
Figure 16:
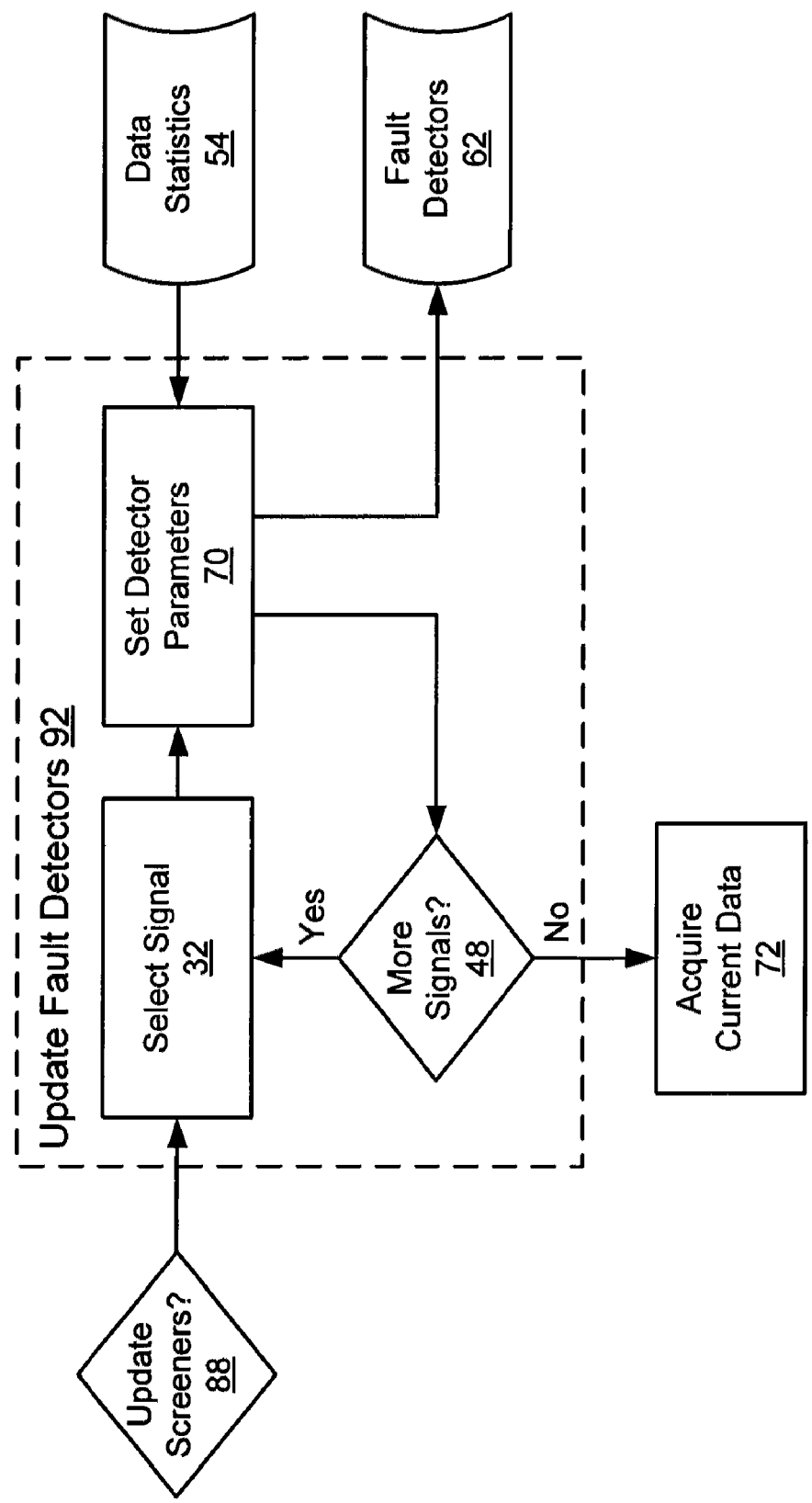
FIG. 16 is a functional flow diagram further detailing an update fault detectors procedure for an embodiment of a calibration procedure of an asset surveillance system and method comprising self-calibrating fault detection.

More specifically, referring to FIGS. 1 and 2 and in one embodiment of the invention, the asset surveillance system and method 10 initializes the fault detectors 62 using data statistics 54 derived from training data 28 acquired 26 from the one or more signals or data sources 22 during periods when the asset 20 is operating normally or as expected. The training data is prepared 30 and then used by the initialization procedure 50 to initialize the one or more fault detectors 62. Thereafter, each observation of current data 74 acquired 72 for the one or more signals or data sources 22 is prepared 30 and then used for performing asset surveillance 76 by evaluating each of the fault detectors 62 for the presence of a faulty, degraded, or erroneous operation or behavior of the asset 20. When a fault is detected, the perform asset surveillance procedure 76 communicates the fault condition, for example by reporting the fault to an operator's display 150 or to a remote computer 154. When no fault is detected, the asset surveillance system and method 10 further processes the current data for the signals or data sources 22 using the calibration procedure 80 to update the calibration of fault detectors 62 used for performing asset surveillance 76. The above described method is then performed iteratively by the system with each successive observation of current data 74 acquired 72, prepared 30 for use, used for performing asset surveillance 76, and used for performing calibration 80 until such time as the user of the asset surveillance system and method 10 terminates the iterative operation of the system.

Furthermore, and in one embodiment, the initialization procedure 50 also initializes one or more data screeners 58 that are special purpose fault detectors used in the calibration procedure 80. The data screeners 58 are also optionally calibrated in the calibration procedure 80. The initialization procedure 50 additionally initializes the record of data statistics 54 for the one or more signals or data sources 22 and/or the prepared data 36 derived from the one or more signals or data sources 22 that is/are used for initializing and for calibrating fault detectors 62 and data screeners 58.

Referring to FIGS. 1 through 16 and in one embodiment of the invention, the steps comprising the asset surveillance system and method 10 are delineated in further detail. The initialization procedure 50 is performed using prepared data 36 that is prepared by the prepare data procedure 30 from the training data 28 that is acquired via the acquire training data procedure 26. Generally, the acquire training data procedure 26 might use any means for coupling the computer 140 with the signals or data sources 22, for example via electrical coupling using the data acquisition and digitization means 24, via the user input means 158, via the memory input means 156, and/or via a remote computer 154. Upon acquiring the prepared data 36, the initialization procedure 50 performs an initialize data statistics 52 step that initializes a data statistics 54 record, an initialize data screeners 56 step that initializes one or more data screeners 58, and an initialize fault detectors 60 step that initializes one or more fault detectors 62.

In one embodiment, the prepare data procedure 30 is used to select and derive prepared data 36 from training data 28, both stored on memory means 142, that is used to initialize the one or more data screeners 58 and the one or more fault detectors 62. The same prepare data procedure 30 is used to select and derive prepared data 36 from current data 74, both stored on memory means 142, that is used by the one or more fault detectors 62 to perform asset surveillance 76 and is used by the one or more data screeners 58 to perform the calibration procedure 80. Generally, the prepare data procedure 30 might perform any data processing necessary to provide prepared data 36 for asset surveillance using fault detectors 62. In one example, the signal or data values might be processed as originally observed or acquired without modification. In another example, the signal or data values might be transformed such as by using the observed or acquired values to generate predictions of expected or related values. In a further example, the corresponding observed and predicted values might be used to compute their mathematical difference values, also known as residual values. Observed values are often used as the input to a fault detector 62 when the observed values represent a stationary signal having a constant mean value. Predicted values can provide many types of transformation. Predicted values might comprise for example smoothed or de-noised values or perhaps values modified to have a zero mean value. In another example, the predicted values are an estimate of the expected values of a non-stationary observed signal. When the predicted values estimated for a non-stationary signal are subtracted from the observed values of the same non-stationary signal, the residual values that result often comprise a stationary signal with a near zero mean value. Such derived residual values are often used as the prepared data 36 that is used for performing asset surveillance 76 using fault detectors 62.

Then, in one embodiment, the prepare data procedure 30 uses the more signals decision procedure 48 to iterate and select each signal or data source 32 and to: selectively add observed data 34 to prepared data 36; compute prediction data 38 using a prediction model 40 and selectively add predicted data 42 to prepared data 36; and compute the residual signal 44 and selectively add residual data 46 to prepared data 36.

In one embodiment, the initialize data statistics procedure 52 uses the prepared data 36 in combination with the more signals decision procedure 48 to iterate and select each signal or data source 32 and to compute and store the data statistics 54 on memory means 142, wherein the data statistics 54 for the selected signal 32 comprise at least the central moments and the sufficient statistics for the prepared data 36 derived from the training data 28. The compute central moments procedure 64 is used to compute at least the central moments of the selected signal's data values using standard statistical methods. The compute central moments procedure 64 might optionally compute other statistics for example and not by limitation the minimum and/or maximum values of the selected signal's data values. The compute sufficient statistics procedure 66 is used in the calibration procedure 80 to compute at least the sufficient statistics needed for a sequential discounting expectation maximization method that is used for performing an update fault detectors procedure 92 and to optionally compute at least the sufficient statistics needed for a sequential discounting expectation maximization method that is used for performing an update data screeners procedure 90.

In one embodiment, the initialize data screeners procedure 56 uses the data statistics 54 in combination with the more signals decision procedure 48 to iterate and select each signal or data source 32 and to selectively set the data screener parameters, which are stored in the data screeners 58 on memory means 142, using the set screener parameters procedure 68. For example and not by limitation, an individual data screener might employ the second central moment data statistic for a signal to compute a threshold parameter for discriminating normal asset behavior from abnormal asset behavior wherein said threshold parameter comprises a multiple of the square root of the second central moment value. In statistics, the second central moment is also known as the variance and its square root is known as the standard deviation.

In one embodiment, the initialize fault detectors procedure 60 uses the data statistics 54 in combination with the more signals decision procedure 48 to iterate and select each signal or data source 32 and to selectively set the fault detector parameters, which are stored in the fault detectors 62 on memory means 142, using the set detector parameters procedure 70. For example and not by limitation, an individual fault detector might employ the second central moment data statistic for a signal to compute a threshold parameter for discriminating normal asset behavior from abnormal asset behavior wherein said threshold parameter comprises a multiple of the square root of the second central moment value.

Upon completing the initialization procedure 50, and in one embodiment, the asset surveillance system and method 10 is used iteratively with each acquired 72 successive observation of current data 74, prepared 30 for use, used for performing asset surveillance 76, and used for performing calibration 80 until such time as the user of the asset surveillance system and method 10 terminates the iterative operation of the system.

In one embodiment, the calibration procedure 80 first performs a screen for good data procedure 82 using the data screeners 58 to determine whether the prepared data 36 is of a quality suitable for use in calibrating the fault detectors 62 and for optionally calibrating the data screeners 58. The data good decision procedure 84 evaluates the screen for good data procedure 82 results to selectively enable the good quality data to be processed by the update data statistics procedure 86 while preventing bad quality data from being used for this purpose. The update data statistics procedure 86 updates the data statistics 54 in preparation for use by the update fault detectors procedure 92, which is used to update fault detectors 62 with new calibration parameters. The update screeners decision procedure 88 is used to optionally perform the update data screeners procedure 90 in combination with the updated data statistics 54, which is used to update data screeners 58 with new calibration parameters.

In one embodiment, the prepared data 36 derived from the current data 74 that is used by the perform asset surveillance procedure 76 and the calibration procedure 80 is derived using the same prepare data procedure 30 that was used to derive the prepared data 36 from the training data 28 to perform the initialization procedure 50.

In one embodiment, the perform asset surveillance procedure 76 can be accomplished by a wide variety of methods that accomplish at least an evaluate fault detector procedure 78 for at least one fault detector 62, most often in combination with the more signals decision procedure 48 to iterate and select each signal or data source 32 to be used selectively with the evaluate fault detector procedure 78 for the at least one fault detector 62. The perform asset surveillance procedure 76 will most often report the results from the evaluate fault detector procedure 78 using the communication means 146 of the computer 140 to output for example but not by limitation the results to one or more of the asset control means 148, display 150, alarm 152, or remote computer 154. The receiver of the reported results might respond with a variety of actions, such as sounding a warning alarm or performing a control action.

More specifically, and in one embodiment, the calibration procedure 80 performs the steps comprising: screen for good data 82, data good decision 84, update data statistics 86, update screeners decision 88, update data screeners 90 optionally, and update fault detectors 92.

In one embodiment, the screen for good data procedure 82 performs the steps comprising determine data quality 94 and update circular buffer 96. The determine data quality procedure 94 uses the prepared data 36 in combination with the more signals decision procedure 48 to iterate and select each signal or data source 32 to be used selectively with the evaluate data screener procedure 100 for at least one data screener 58. The evaluate data screener procedure 100 processes the signal data to discriminate normal asset behavior from abnormal asset behavior, wherein the detection of an abnormal asset behavior is determined to be a fault condition. If the evaluate data screener procedure 100 determines that a fault condition is present, the fault found decision procedure 102 causes an update max window size procedure 104 to be performed prior to returning to the more signals decision 48 iteration loop. The update max window size procedure 104 updates a max window size 106 variable that is stored on memory means 142 for each observation of prepared data 36 that contains a fault.

In one embodiment, the update circular buffer procedure 96 uses the results of the determine data quality procedure 94 to update the contents of a circular buffer 98 of data stored on memory means 142. The any faults decision procedure 108 determines whether any faults were found by any of the data screeners 58 in performing the determine data quality procedure 94. In no faults were found by any of the data screeners 58, the current data observation is marked as "good" and placed in the circular buffer 98 using the mark current data point good procedure 114. However, if a fault was found by any of the data screeners 58 the max window size 106 of potentially "bad" data is determined using a determine max window size 110 procedure. The purpose for determining a window of bad data arises from the fact that a data screener 58, in some possible embodiments, might require a series of current data 74 observations for the purpose of ascertaining whether the series of current data 74 observations indicate a possible fault of the asset 20. In the event that a series of current data 74 observations are used to indicate for a possible fault of the asset 20, it is conservative to regard all observations within the series of current data 74 observations as "bad" when a possible fault of the asset 20 is indicated. The mark window of data bad procedure 112 performs the step of adding the current data observation to the circular buffer 98 and marking the window of data within the circular buffer 98 with a bad data marking.

In the event that the current data observation is marked as good, and in one embodiment, the good data decision procedure 84 is used to conditionally perform the updating steps that comprise the calibration of the fault detectors 62 and optionally the calibration of the data screeners 58. The updating steps begin with the update data statistics procedure 86 that uses the good data in the circular buffer 98 in combination with the more signals decision procedure 48 to iterate and select each signal or data source 32 to be used selectively with the update sufficient statistics procedure 116 and the update central moments procedure 118 to update the data statistics 54. The update sufficient statistics procedure 116 is used to update at least the sufficient statistics in the data statistics 54 that are used in a sequential discounting expectation maximization method for further updating the data statistics 54. Using the updated sufficient statistics stored in the data statistics 54, the update central moments procedure 118 is used to update at least the central moments of the selected signal's data values using a sequential discounting expectation maximization method and to store the computed central moment values in the data statistics 54. The update central moments procedure 118 might optionally update other statistics for example but not by limitation the minimum and/or maximum values of the selected signal's data values.

Having derived the updated data statistics 54, and in one embodiment, the fault detectors 62 and optionally the data screeners 58 are updated to reflect the new calibration information. The update screeners decision procedure 88 controls whether the data screeners are updated using the update data screeners procedure 90. When used, the update data screeners procedure 90 is used in combination with the more signals decision procedure 48 to iterate and select each signal or data source 32 to be used selectively with the set screener parameters procedure 68 and the data statistics 54 to update the data screener 58 parameters. For example and not by limitation, an individual data screener might be updated to employ an updated second central moment data statistic for a signal to compute a threshold parameter for discriminating normal asset behavior from abnormal asset behavior wherein said threshold parameter comprises a multiple of the square root of the updated second central moment value.

In one embodiment, the update fault detectors procedure 92 is used in combination with the more signals decision procedure 48 to iterate and select each signal or data source 32 to be used selectively with the set detector parameters procedure 70 and the data statistics 54 to update the fault detector 62 parameters. For example and not by limitation, an individual fault detector might be updated to employ an updated second central moment data statistic for a signal to compute a threshold parameter for discriminating normal asset behavior from abnormal asset behavior wherein said threshold parameter comprises a multiple of the square root of the updated second central moment value.

Upon completing the calibration procedure 50, and in one embodiment, the asset surveillance system and method 10 then proceeds to acquire 72 a next observation of current data 74 and the surveillance and calibration procedures are repeated until such time as the user of the asset surveillance system and method 10 terminates the iterative operation of the system.

Having described the asset surveillance system and method comprising self-calibrating fault detection 10 and the various system elements and procedure steps employed in one embodiment, at this point an embodiment is further described by considering an illustrative example.

Illustrative Example

The steps taken by the asset surveillance system and method 10 in combination with computer 140 and memory means 142 are as shown in FIGS. 1 through 16 and are described by way of example as follows.

To begin, and in one embodiment, a set of signals or data sources 22 are chosen to be evaluated using the asset surveillance system and method 10 wherein the number of selected signals or data sources is herein denoted as n. Often, the selected signals will be used in combination with one or more prediction models 40 to compute a residual signal. This is often done because many times an observed signal from an asset is non stationary and is unsuitable for use directly with a statistical type of fault detector that examines the signal for changes to its statistical properties to detect a fault condition. However, computing the difference between an observed signal and a corresponding predicted signal can provide a derived residual signal that exhibits the desired stationary characteristic and is useful for detecting a fault condition of the asset. Notable is that many types of prediction models 40 and other forms of transformation can be used to serve this purpose.

Having chosen a suitable prediction model 40, and in one embodiment, the prepared data 36 can be derived for the chosen n signals or data sources using data acquired from the asset 20 for example by computing a set of n residual signals correlative to the chosen n signals or data sources. Using the data acquisition and digitization means 24, an acquire training data procedure 26 is used to acquire a set of training data 28 comprised of observations of the n modeled signals or data sources 22 taken when the asset is operating normally or in an expected fashion. This is the data that is used to initialize the data screeners 58 and the fault detectors 62. The training data 28 is transformed to the prepared data 36 using the prepare data procedure 30, which computes the residual signal values.

Next, and in one embodiment, a data screener and a fault detector pair are defined for at least one of the prepared signals or data sources contained in the prepared data 36. The data screener is itself a fault detector that performs the function of determining signal data quality. Only data that is determined to be "good" data upon evaluation by the data screener will be used for dynamic calibration of the corresponding fault detector used for performing surveillance of the asset 20.

The data screener and the fault detector are most often of a statistical type that during surveillance of the asset will examine the statistical characteristics of a time series of prepared data 36 derived from current data 74 to determine whether the statistical properties of the time series have deviated from the expected statistical properties that were learned initially from the prepared data 36 derived from training data 28. For example, the mean of a signal in the prepared data 36 derived from current data 74 might be examined to determine if it has deviated from the mean of the same signal in the prepared data 36 derived from training data 28 by more than N standard deviations of the signal in the prepared data 36 derived from training data 28. In this example, the initialization of the data screener and fault detector parameters involves computing data statistics 54 comprising the mean and standard deviation values from the prepared data 36 derived from training data 28. The methods for computing the central moments of a set of data, including the mean (first moment) and standard deviation (second moment), are well known to persons skilled in the art. Generally, the parameters for the data screener and fault detector pair will be set so that the data screener will be more sensitive to disturbances in the current data 74 than is the fault detector. For example, the data screener might implement a threshold for detecting a deviation that is set at 6 standard deviations of the signal in the prepared data 36 derived from training data 28 while the fault detector might implement a threshold for detecting a deviation that is set at 3 standard deviations of the signal in the prepared data 36 derived from training data 28. Initializing the data screener and fault detector therefore comprises initializing data statistics 54 using the prepared data 36 derived from training data 28 and then using these data statistics 54 to set data screener parameters 68 and set fault detector parameters 70.

Note that while this example and the figures presented herein might appear to imply that the training data 28 is acquired from the same asset that is the subject of the surveillance and calibration procedures using the current data 74, this presentation is only representative of one embodiment of the invention and is not a limitation or requirement for the practice of the invention. In fact, it will often be the case in other embodiments of the invention that the training data 28 will be acquired from one or more assets other than the asset 20 that is the subject of the current surveillance and calibration procedures using the current data 74. For example but not by limitation, the training data 28 will often be acquired from a family of similar assets such that the normal statistical variations between individual assets are represented in the training data 28. The asset surveillance system and method 10 might then be initialized using this population-based training data 28. In practice of the asset surveillance system and method 10, current data 74 is then acquired from a specific asset 20 and used for asset surveillance 76 and calibration 80. The advantages of this system and approach are easily seen. When first applied, the asset surveillance procedure 76 is performed based on generalized population data statistics 54. However, as surveillance proceeds the calibration procedure 80 adapts and fine tunes the asset surveillance procedure 76 for the data statistics 54 of the specific asset 20. This dynamic calibration system and approach provides a clear advantage by enabling asset surveillance system performance that is superior to the performance achievable using a statically calibrated surveillance system.

Having initialized the data screeners 58 and fault detectors 62, and in one embodiment, the data acquisition and digitization means 24 is used to acquire 72 current data 74 for the chosen n signals or data sources from the asset 20. The prepare data procedure 30 is used to prepare the prepared data 36 from the current data 74.

Next, and in one embodiment, the perform asset surveillance procure 76 is used to identify and report faults in any of the chosen n signals or data sources. Faults might be reported by a variety of means and the reporting might be used for a variety of purposes. For example and not by limitation faults might be reported to a display 150 or to a remote computer 154 and the reporting might be used to effect an alarm via an alarm means 152 or to effect a control action via an asset control means 148. Reporting might also be used to effect additional processing on the computer 140 or remote computer 154 such as the performance of a diagnostic assessment of the asset status and/or the performance of a prognostic assessment of the asset's remaining useful life. Modern surveillance systems often employ these further diagnostic and/or prognostic steps in post processing the results of asset surveillance performed for the purpose of fault detection.

After performing the perform asset surveillance procure 76, and in one embodiment, the calibration procedure 80 is performed to calibrate dynamically the fault detectors 62 and optionally the data screeners 58. The calibration procedure 80 employs a screening method to determine whether the prepared data 36 derived from current data 74 is suitable for use in dynamic calibration of the fault detectors 62. The screen for good data procedure 82 is used to determine whether the prepared data 36 derived from current data 74 meets at least one predefined criterion. Data that meets at least the one predefined criterion can be defined as good quality data and in one embodiment, at least one predefined criterion for good quality data is defined to mean data that might include normal aging data but that excludes any data representing a degrading condition such as accelerated aging or failure of the asset 20.

In one embodiment, the at least one predefined criterion for defining good quality data is that all data screeners 58 configured for the chosen n signals or data sources identify no fault conditions when used to analyze the current data 74. If a fault condition is identified for any one data screener, the maximum window size 106 parameter is updated using the update max window size procedure 104. If a fault condition is identified for any of the data screeners, a determine max window size procedure 110 is used to determine the maximum window size used by any of the data screeners that identified a fault condition based on the current data. The maximum window size determined is used to determine the window of data that must be marked as bad quality data and removed from use for fault detector calibration.

In one embodiment, a circular buffer 98 on memory means 142 is used to store a time series of the prepared data 36 derived from current data 74 that might be used for fault detector calibration. The circular buffer 98 includes marking information for each observation of prepared data 36 derived from current data 74 for the chosen n signals or data sources. The marking information denotes whether the individual data observation within the series is "good" or "bad." Good data is defined to mean data that might include normal aging data but that excludes any data representing accelerated aging or failure of the asset 20. Only good data is used for fault detector calibration.

In one embodiment, the screen for good data procedure 82 is used to determine whether the prepared data 36 derived from current data 74 meets the at least one predefined criterion for good data. If the prepared data 36 derived from current data 74 is determined to be good, the prepared data is added to the circular buffer 98 and marked as good. If the prepared data 36 derived from current data 74 is determined to be bad, the prepared data is added to the circular buffer 98 and marked as bad. In addition, the max window size-1 previously added prepared data points in the circular buffer 98 are also marked as bad.

In one embodiment, the data good decision procedure 84 is used to determine if the circular buffer 98 contains data that will be used for fault detector calibration. The data good decision procedure 84 first determines if the circular buffer 98 is full of data. If the circular buffer 98 is not full, no updating for fault detector calibration is performed and more current data 74 is acquired 72. If the circular buffer 98 is full and if the first element in the circular buffer is marked as good the data in the circular buffer 98 is good and updating for fault detector calibration is performed. If the circular buffer 98 is full and if the first element in the circular buffer is marked as bad the data in the circular buffer 98 is bad and updating for fault detector calibration is not performed.

If the data good decision procedure 84 determines that the circular buffer 98 contains good data, and in one embodiment, the update data statistics procedure 86 is performed using at least one element of the good data contained in the circular buffer 98. For example, the first element of the good data contained in the circular buffer 98 might be used or in the alternative more than one of the good data elements contained in the circular buffer 98 might be used in combination with the update data statistics procedure 86 to update the data statistics 54 for the prepared data 36 derived from the current data 74 for the chosen n signals or data sources. In one embodiment, the method used by the update data statistics procedure 86 to update the data statistics 54 using the good data contained in the circular buffer 98 is a sequential discounting expectation maximization method described mathematically herein below.

It is important that bad quality data is not used to update the data statistics 54 and thereby used to update the fault detectors 62 and optionally the data screeners 58. The data screeners 58 must therefore be configured to identify any potentially bad data in order to prevent the bad data from being used for updating. The data screeners 58 can be implemented for example but not by limitation using any highly accurate form of fault detector. The data screeners 58 can also be updated dynamically using the update data screeners procedure 90. In one embodiment, the method used by the update data statistics procedure 86 to update the data statistics 54 can prepare updated data statistics 54 for use by the update data screeners procedure 90 that is different from the updated data statistics 54 prepared for use by the update fault detectors procedure 92. For example, the updated data statistics 54 for use by the update data screeners procedure 90 might be constrained to adapt more slowly to the good quality data to guard against the possibility of adapting to an asset fault condition. Meanwhile, the updated data statistics 54 for use by the update fault detectors procedure 92 might be permitted to adapt more rapidly to the good quality data to ensure highly accurate and sensitive detection of an asset fault condition.

Having updated the data statistics 54 using the good data contained in the circular buffer 98, and in one embodiment, it is then straightforward to update the fault detectors 62 using the set detector parameters procedure 70 and to optionally update the data screeners 58 using the set screener parameters procedure 68 that are the same procedures used for initializing the fault detectors and data screeners with the initial data statistics derived from the training data 28.

The steps of the asset surveillance system and method 10 beginning with the acquire current data procedure 72 can then be repeated until such time as the user of the asset surveillance system and method 10 terminates the iterative operation of the system for performing data acquisition, preparation, surveillance and calibration.

Sequential Discounting Expectation Maximization Method

The asset surveillance system and method comprising self-calibrating fault detection 10 provides accurate identification of faults for a degrading asset. In one embodiment, the asset surveillance system and method comprising self-calibrating fault detection 10 uses a sequential discounting expectation maximization method in performing the update data statistics procedure 86. The following is a mathematical description of the sequential discounting expectation maximization method.

A data value $x_t$ corresponds to one of an observed, predicted or residual data value derived from a signal or data source 22 acquired from an asset 20 at a given time t and that is determined to be a good data value 84. The data statistics 54 are computed for each individual observed, predicted or residual signal derived from signal or data source 22. The data statistics 54 are most often the central moments for the observed, predicted or residual signal data values. The first central moment $\mu^t$ is the mean of the data at a given time t. The $m^{th}$ central moment at a given time t is denoted as $\mu_m^t$.

Sequential Discounting

We define sufficient statistics $\bar{\mu}_m^t$ for sequential discounting expectation maximization given the data $x_t$ at time t using the following equation.

$$\bar{\mu}_m^t = \mu_m^t + \sum_{k=1}^{m-2} (^mC_k)(\mu^t)^k \mu_{m-k}^t + (\mu^t)^m \quad \text{(E1)}$$

where $^mC_k = m!/(k!(m-k)!)$ is a mathematical quantity defining the number of ways for selecting k items from a set of m items.

The data statistics are computed using the sufficient statistics as follows. The term $\mu_m^0$ represents a data statistic computed for the $m^{th}$ central moment using the initialize data statistics procedure 52. The sufficient statistics are initialized using the following equation.

$$\bar{\mu}_m^0 = \mu_m^0 + \sum_{k=1}^{m-2} (^mC_k)(\mu^0)^k \mu_{m-k}^0 + (\mu^0)^m \quad \text{(E2)}$$

The sequential discounting expectation maximization method updates the data statistics incrementally with each new $x_t$ value using the following two steps.

Expectation Step

Given the sufficient statistics $\bar{\mu}_m^{t-1}$ at previous time t-1, compute the updated sufficient statistic $\bar{\mu}_m^t$ using the following equation.

$$\bar{\mu}_m^t = (1-\beta)\bar{\mu}_m^{t-1} + \beta x_t^m \quad \text{(E3)}$$

where $\beta$ is a discounting parameter.

Maximization Step

The central moments are then updated in the maximization step using the following equation.

$$\mu_m^t = \bar{\mu}_m^t - \sum_{k=1}^{m-2} (^mC_k)(\mu^t)^k \mu_{m-k} - (\mu^t)^m \quad (E4)$$

Equation (E4) serves to update the central moments such that the weighted sum of the log likelihood of log $p(x_j|\mu, \mu_2, \ldots \mu_m)$ is maximized with respect to j, where j varies from 1 to t, where $p(x_j|\mu, \mu_2, \ldots \mu_m)$ is the probability of $x_j$ given the data statistics, and where the weight for j is given by $\beta(1-\beta)^{t-j}$.

The discounting parameter $\beta$ controls the degree of discounting of past data values. The discounting parameter can take any value between 0 and 1. The higher the $\beta$ value, the greater the degree of discounting of past data values.

As explained previously, it is important that bad quality data is not used to update the data statistics and thereby used to update the fault detectors and data screeners. It is desirable that the fault detectors adapt quickly to the good quality data. To achieve this one might set the $\beta$ value to be high for these fault detectors. At the same time, it is desirable that the data screeners reject bad quality data. To achieve this one might set the $\beta$ value to be low for the data screeners. In one embodiment of the asset surveillance system and method comprising self-calibrating fault detection 10, the parameters for the sequential discounting expectation maximization method are set individually for each of the fault detectors 62 and data screeners 58 with the associated data statistics for the individual fault detectors and data screeners stored in the data statistics 54.

In-Service Application and Use

In use and operation, and referring to FIGS. 1 through 32, the asset surveillance system and method comprising self-calibrating fault detection 10 will be further exemplified from the results of its use and operation in work for the United States Navy. In this work for the United States Navy, prediction models for electronic power supplies were developed and an embodiment of the asset surveillance system and method comprising self-calibrating fault detection 10 was produced and tested. Software was developed that implements on a computer system this embodiment of the asset surveillance system and method 10 to accomplish automatic fault detection for a power supply asset. Results show that the software embodiment of the asset surveillance system and method comprising self-calibrating fault detection 10 accurately identifies faults in an aging power supply asset with a very low incidence of false alarms and missed alarms and with better performance than a comparative static surveillance system.

Figure 17:
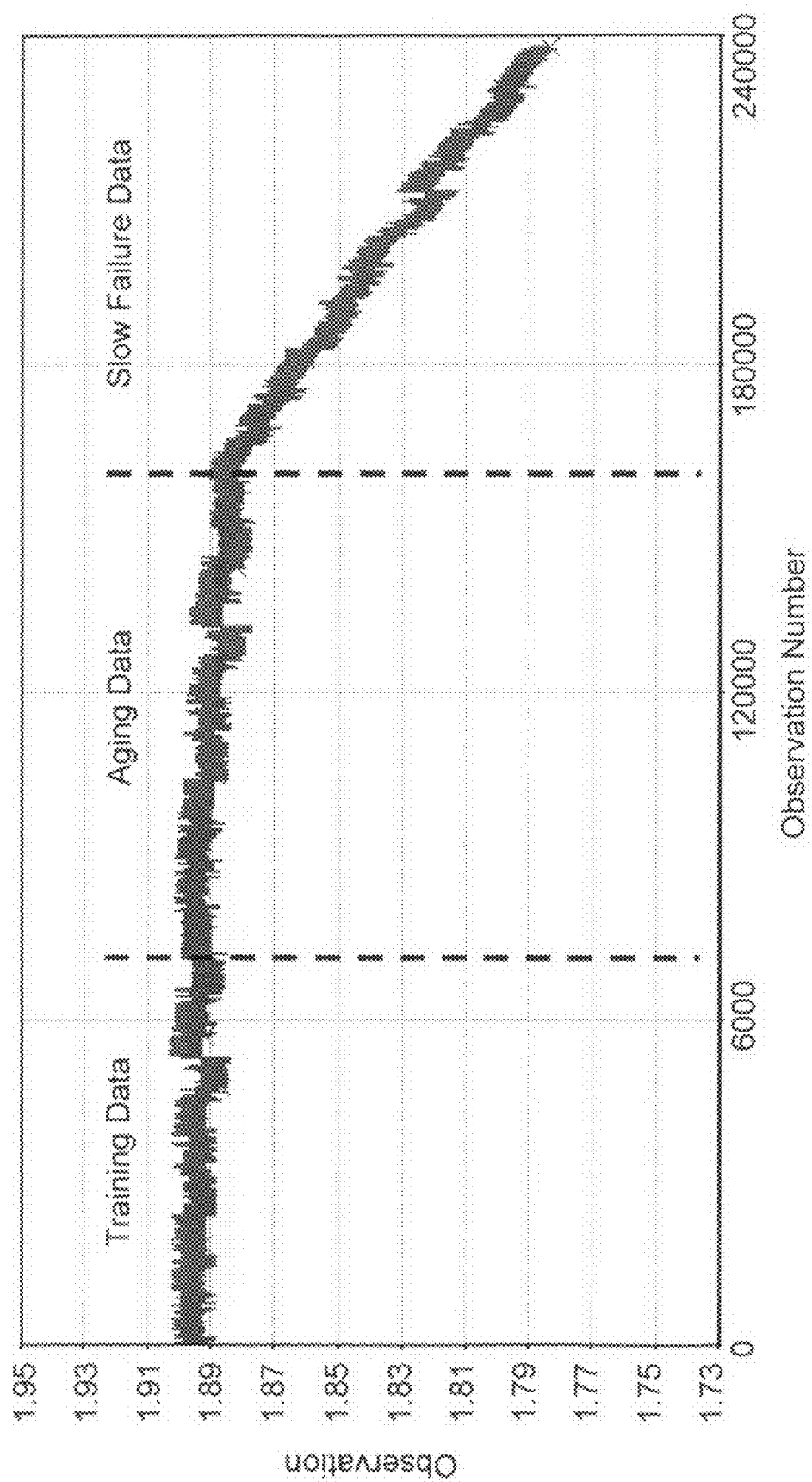
FIG. 17 is a plot of training, aging, and slow failure power supply voltage data.

Power supply voltage, current and temperature data was obtained from testing of electronic power supplies used in computer servers. The testing data contained 79,635 data observations of the voltage, current and temperature values from normal expected operation of the power supply and was used as the training data. Referring to FIG. 17, it is apparent that the power supply voltage data obtained from the testing is not stationary and exhibits fluctuations over the range of normal operating conditions. For this reason, the testing data was used to prepare a prediction model for estimating the expected value of the power supply voltage over the expected range of operating conditions. Residual values were computed as the difference between the observed voltage values and the prediction model estimated voltage values and the residual values were used for initializing and operating the data screeners and fault detectors used for power supply surveillance.

Aging of the power supply was simulated by imposing on the voltage training data a small drift of $-1.0 \times 10^{-8}$ volts per observation. Slow failure was simulated by imposing on the voltage training data a larger drift of $-1.0 \times 10^{-7}$ volts per observation. Additionally, a shift of $-0.008$ volts was added to the simulated slow failure voltage data to simulate the occurrence of slow failure after the aging. The training, aging and slow failure data are shown in FIG. 17. Several statistical properties of the training, aging and slow failure data are listed in FIG. 18.

Referring to FIG. 18, the voltage training data has a mean of 1.8928V. The normal operating range for the voltage is defined as +/−2% deviation from the mean (1.9306V, 1.8549V), which is in agreement with the training data. The power supply is considered to have failed if the voltage exceeds +/−5% deviation from the mean (1.984V, 1.7981V), which is observed to occur in the slow failure data. Referring again to FIG. 18, simulated aging begins at observation number 79,366 and simulated slow failure begins after the training and aging periods at observation number 158,731.

Figure 19:
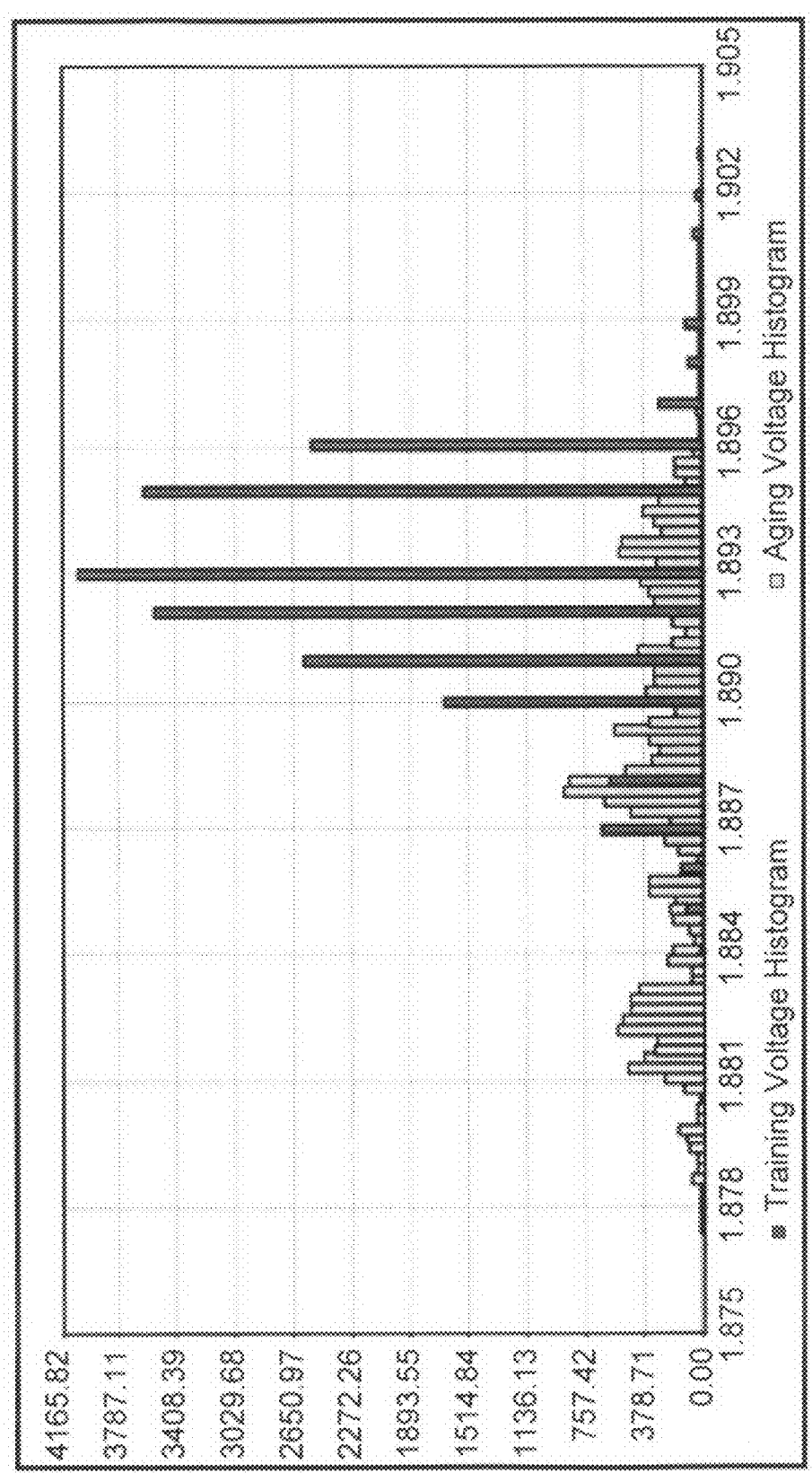
FIG. 19 is a histogram plot of training data and simulated aging data for the power supply voltage data.
Figure 20:
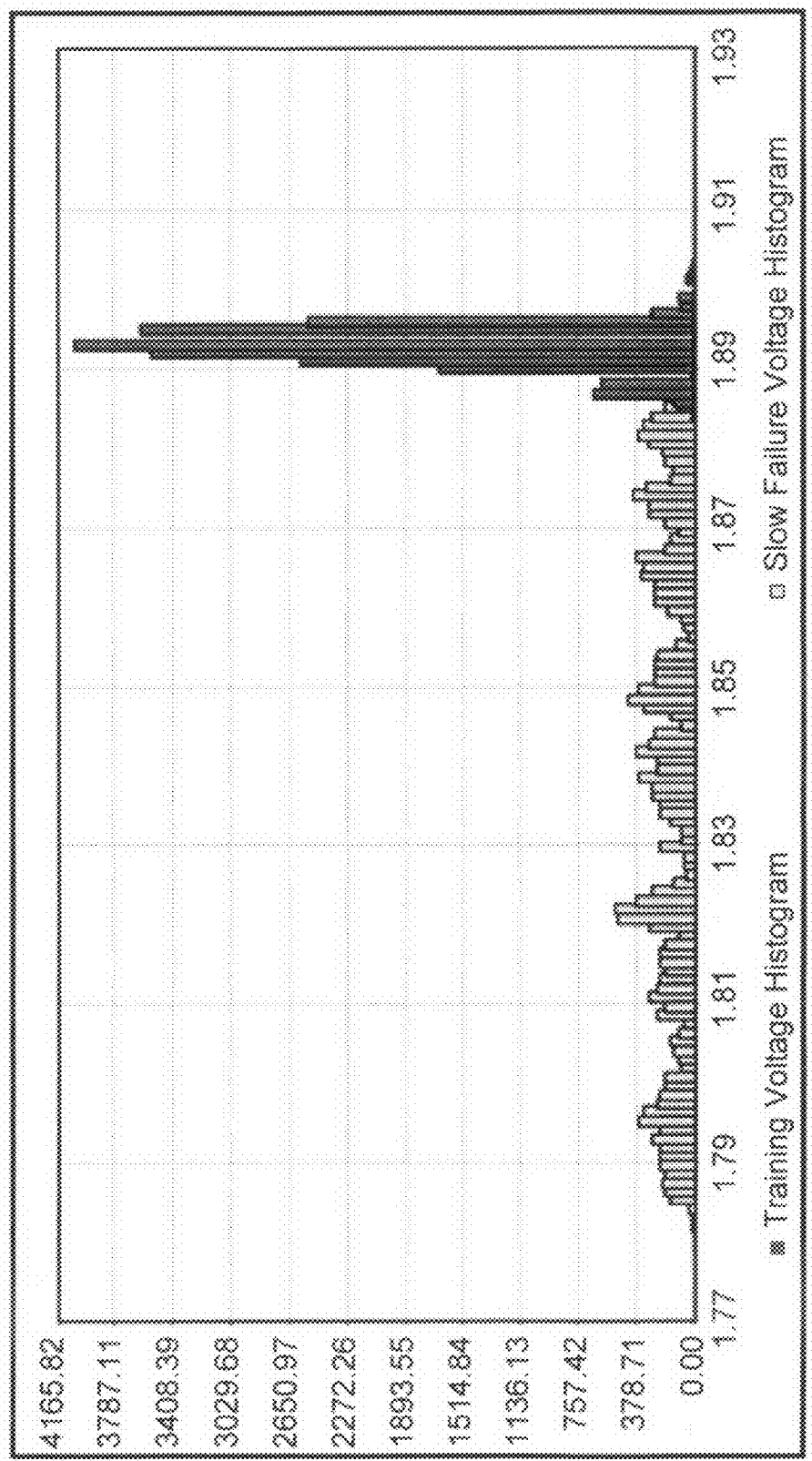
FIG. 20 is a histogram plot of training data and simulated slow failure data for the power supply voltage data.

FIGS. 19 and 20 show histograms of the training data, the simulated aging data, and the simulated slow failure data. In FIG. 19, the data is observed to shift to the left as the signal drifts downward due to normal aging. In FIG. 20, a larger shift to the left is observed as the signal is shifted downward and drifts downward at an accelerated rate due to the abnormal, accelerated aging indicative of incipient failure.

For this example, the data screeners and the fault detectors were implemented using a highly accurate statistical fault detector known as an adaptive sequential probability (ASP) mean fault detector. The ASP mean fault detector is capable of detecting very subtle changes in a stationary signal contaminated by non-Gaussian noise. The ASP mean fault detector is well suited for detecting changes in the mean value of a residual signal formed by the difference between a model predicted signal and a corresponding observed signal, such as the voltage residual signals prepared for use in surveillance of the power supply tested in this example.

The ASP fault detector is described in U.S. Pat. No. 7,158,917 which is incorporated herein by reference in its entirety. Additionally, the ASP fault detector is described in U.S. Pat. No. 7,082,379 which is incorporated herein by reference in its entirety. Furthermore, the ASP fault detector is described in U.S. Pat. No. 6,892,163 which is incorporated herein by reference in its entirety.

Two ASP mean fault detector types were implemented for this testing, one static and one self-calibrating by the system and method of the instant invention. The two types of ASP mean fault detectors implemented were identical except as follows: the static ASP fault detectors each used an ASP mean fault detector that was initialized from the training data or from the training data in combination with the aging data but was not updated dynamically; the self-calibrating ASP fault detectors each used an ASP mean data screener in combination with an ASP mean fault detector wherein both the data screeners and fault detectors were initialized from the training data and were subsequently updated dynamically from the aging data using the asset surveillance system and method comprising self-calibrating fault detection 10.

The ASP mean fault detectors used up to six central moments as parameters in their configuration. The self-calibrating ASP mean fault detectors were updated each time the asset surveillance system and method 10 was used to update the data statistics.

In this application, the asset surveillance system and method 10 was developed to monitor three signals (n=3) indicative of power supply condition. These signals are voltage, current, and temperature with ASP mean fault detectors configured to monitor residual values for each. A single multivariate kernel regression parameter estimation model was used to estimate all three signals. The ASP mean fault detectors and data screeners were each set with their default configuration values. ASP mean data screeners were employed to reject bad quality data. ASP mean fault detectors were employed to identify signal faults indicative of power supply degradation or failure. The decay parameter values used for updating the data statistics for the data screeners and fault detectors with the sequential discounting expectation maximization method were set as listed in FIG. 21.

The following conclusions were obtained from an evaluation of the training, aging and slow failure data using the asset surveillance system and method comprising self-calibrating fault detection 10. First, the self-calibrating fault detectors report fewer false alarms in the aging data than do the static fault detectors. By definition, any faults found in the aging data were considered false alarms. Second, the data screeners used with the self-calibrating fault detectors correctly reject a very high percentage of the slow failure data. Third, the self-calibrating fault detectors trained on the original training data and updated on the aging data detect failures in the slow failure data sooner than the static fault detectors trained on the original training data and the aging data.

The results using the static fault detectors were compared with the results using the self-calibrating fault detectors. That is, the results from the static ASP mean fault detectors were compared to the results from the self-calibrating ASP mean fault detectors with ASP mean data screeners. The results are summarized in FIG. 22 wherein the self-calibrating ASP fault detectors employing dynamic calibration are shown to achieve a greater than 99% reduction in false alarms in comparison to the static ASP fault detectors when processing the aging data.

Figure 23:
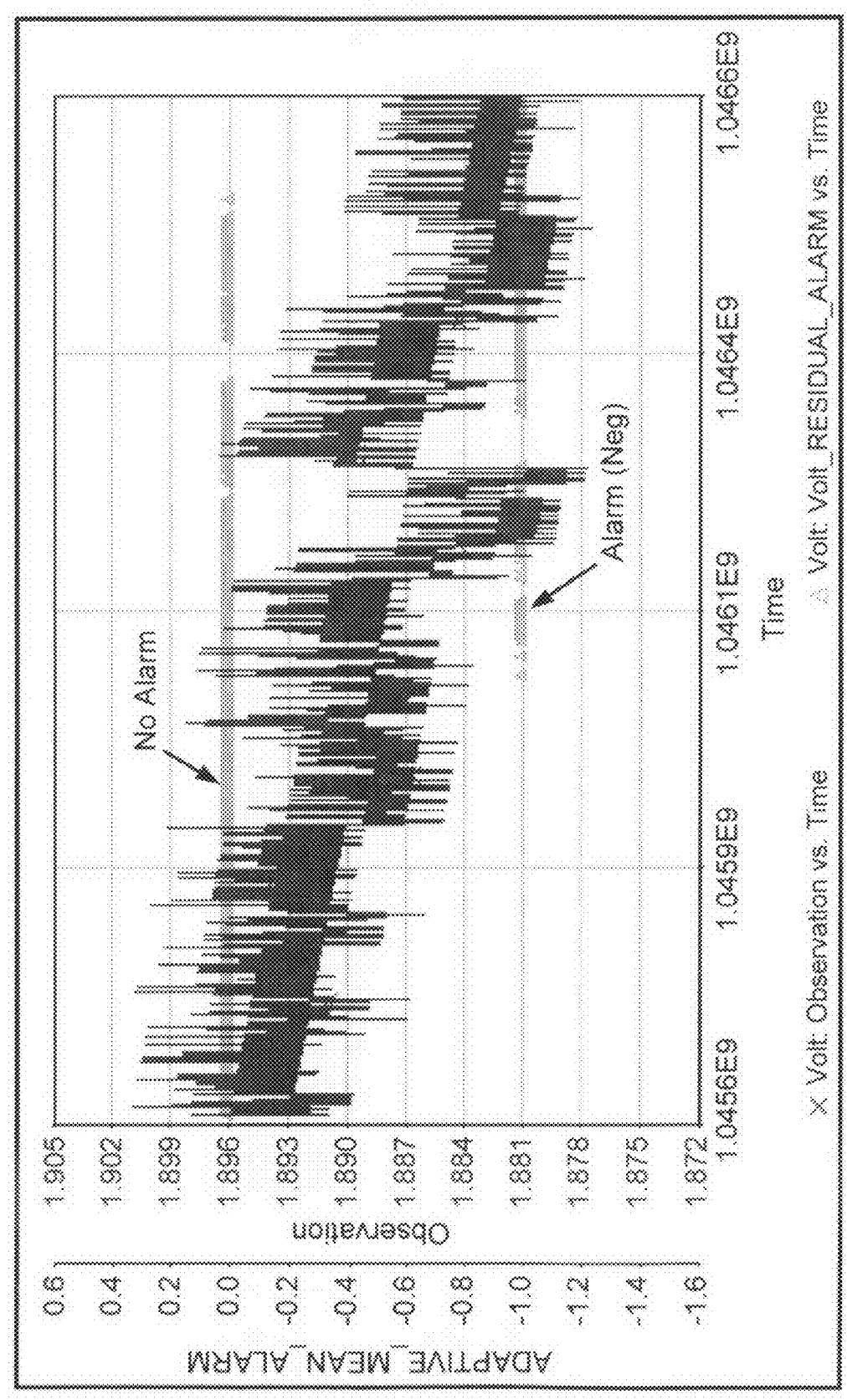
FIG. 23 is a plot of static ASP mean fault detector alarms and voltage data for power supply aging.
Figure 24:
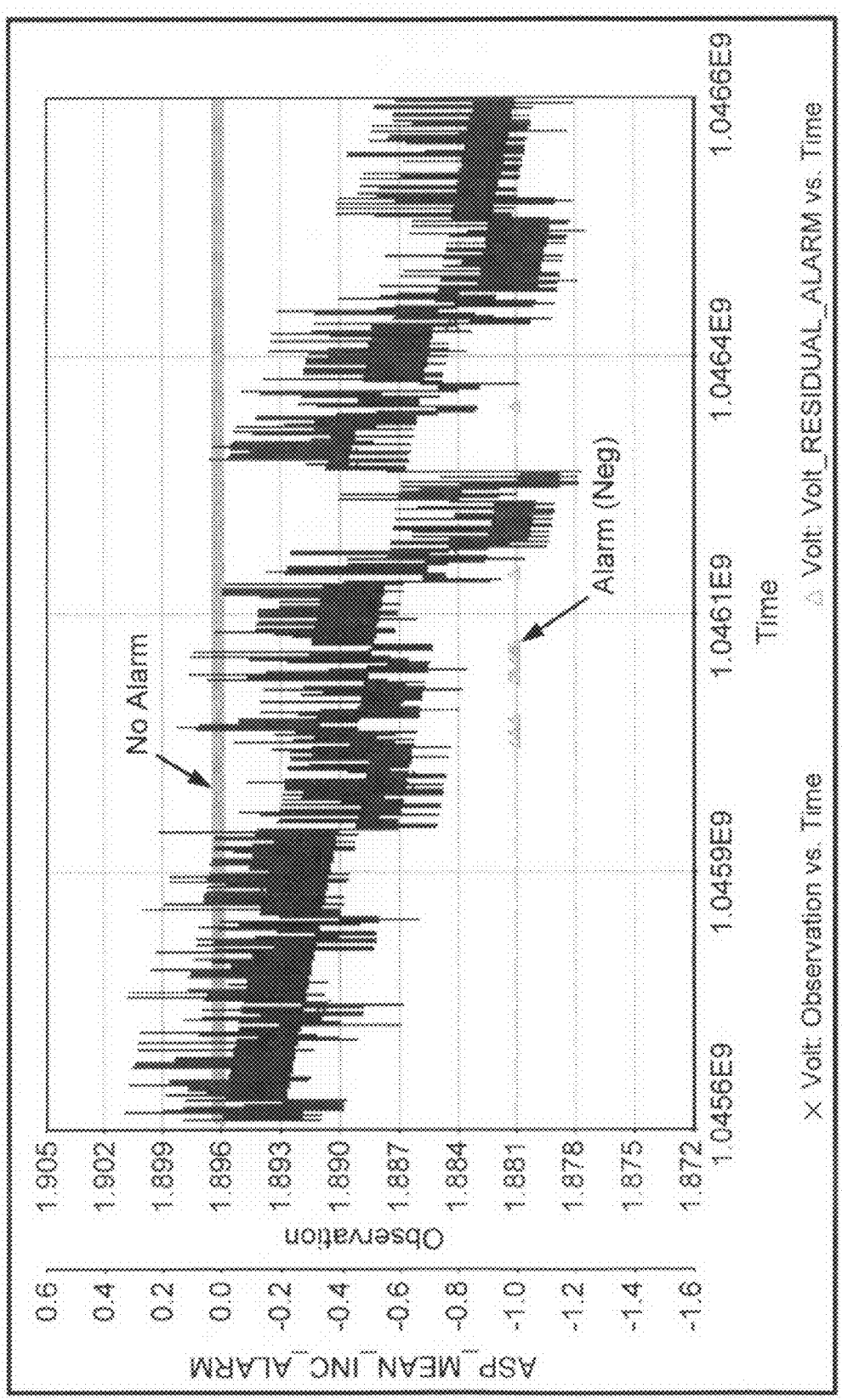
FIG. 24 is a plot of self-calibrating ASP mean fault detector alarms and voltage data for power supply aging.

The aging data residuals and false alarms are shown in FIG. 23 for the static ASP mean fault detector applied to the voltage signal and in FIG. 24 for the self-calibrating ASP fault detector applied to the voltage signal. In these figures, the false alarms are indicated by "Alarm (Neg)." Far fewer false alarms are evident in FIG. 24 when compared to FIG. 23 thus illustrating the significant advantage of the asset surveillance system and method comprising self-calibrating fault detection 10 over the static methods available previously.

Figure 25:
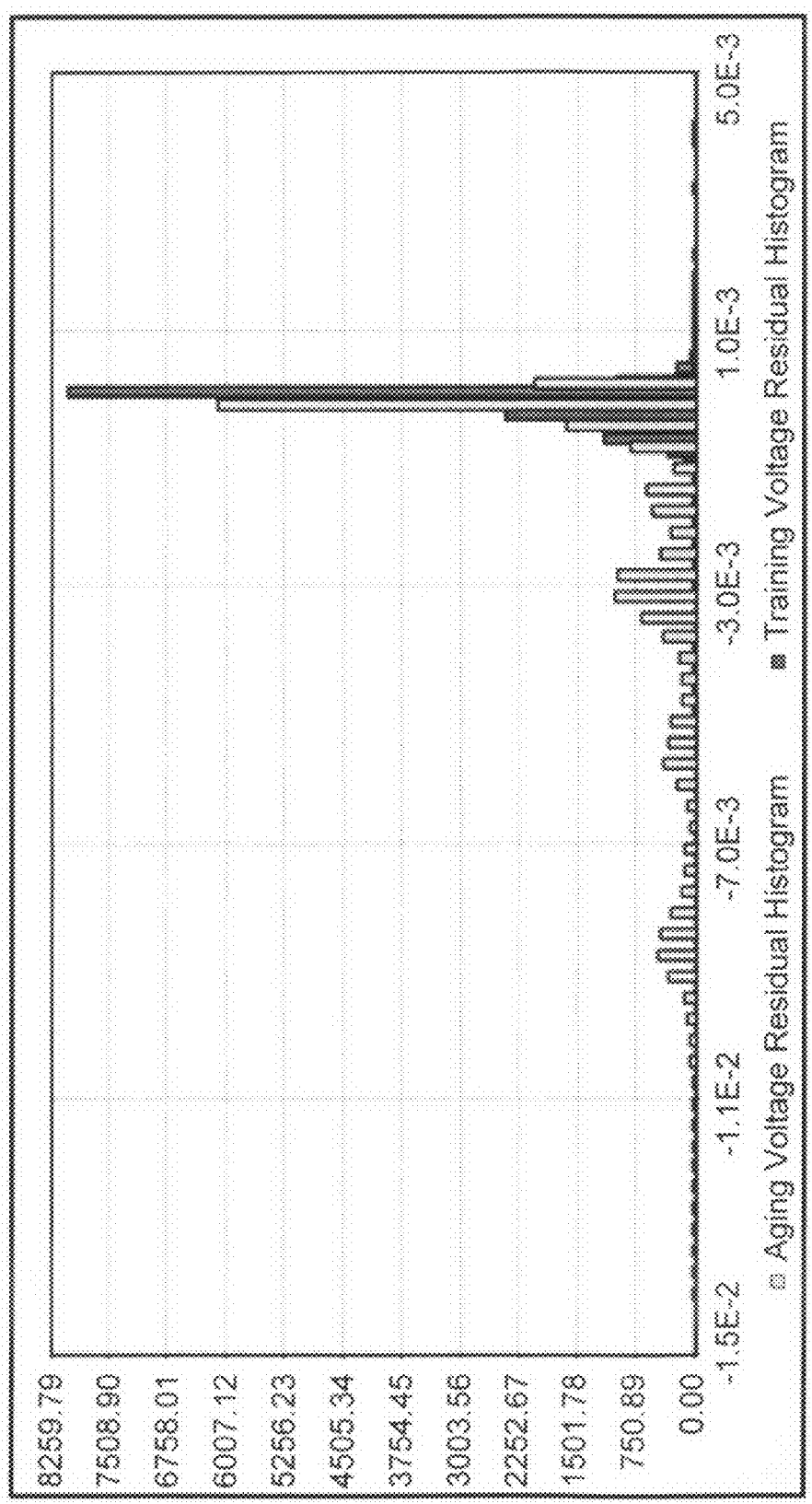
FIG. 25 is a histogram plot of voltage residuals for aging data and training data.

The distribution of the voltage signal's original training data residual is shown by the darker shaded histogram in FIG. 25. The distribution of the voltage signal's aging data residual is shown by the lighter shaded histogram in FIG. 25. This information shows that the aging data distribution is shifting to the left and moving towards a distribution that is more uniform than Gaussian.

These results indicate that the asset surveillance system and method 10 works very well in performing incremental updating for self-calibration of fault detectors. However, the question arises as to whether the asset surveillance system and method 10 will cause the fault detectors to adapt to slow failure data that it should instead reject as faulty. Ideally, the self-calibrating fault detectors should adapt to the aging data and reject the slow failure data. These two objectives run counter to each other, but the use of fault detectors and data screeners together in the asset surveillance system and method 10 permits a balancing of one objective versus the other. The question to be answered is "Will the self-calibrating fault detectors correctly identify the slow failure data?"

To answer this question, the same models described hereinabove were employed. The self-calibrating fault detectors were initialized from the training data, then run with updating over the aging data, and finally, run over the slow failure data. The static fault detectors were initialized from the training data and the aging data. The static fault detectors were then operated over the slow failure data.

Figure 26:
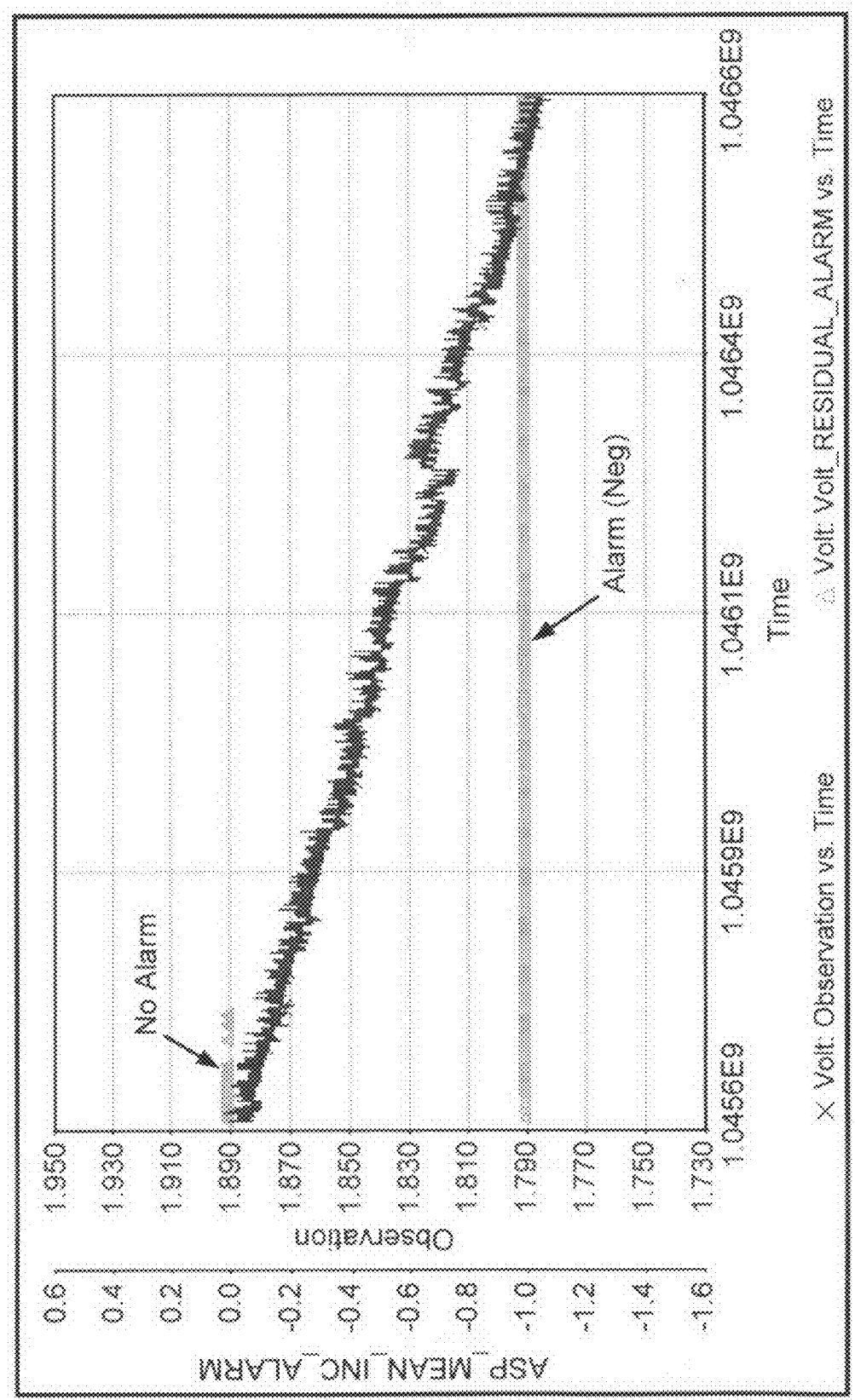
FIG. 26 is a plot of self-calibrating ASP mean fault detector alarms and voltage data for slow failure of a power supply.
Figure 27:
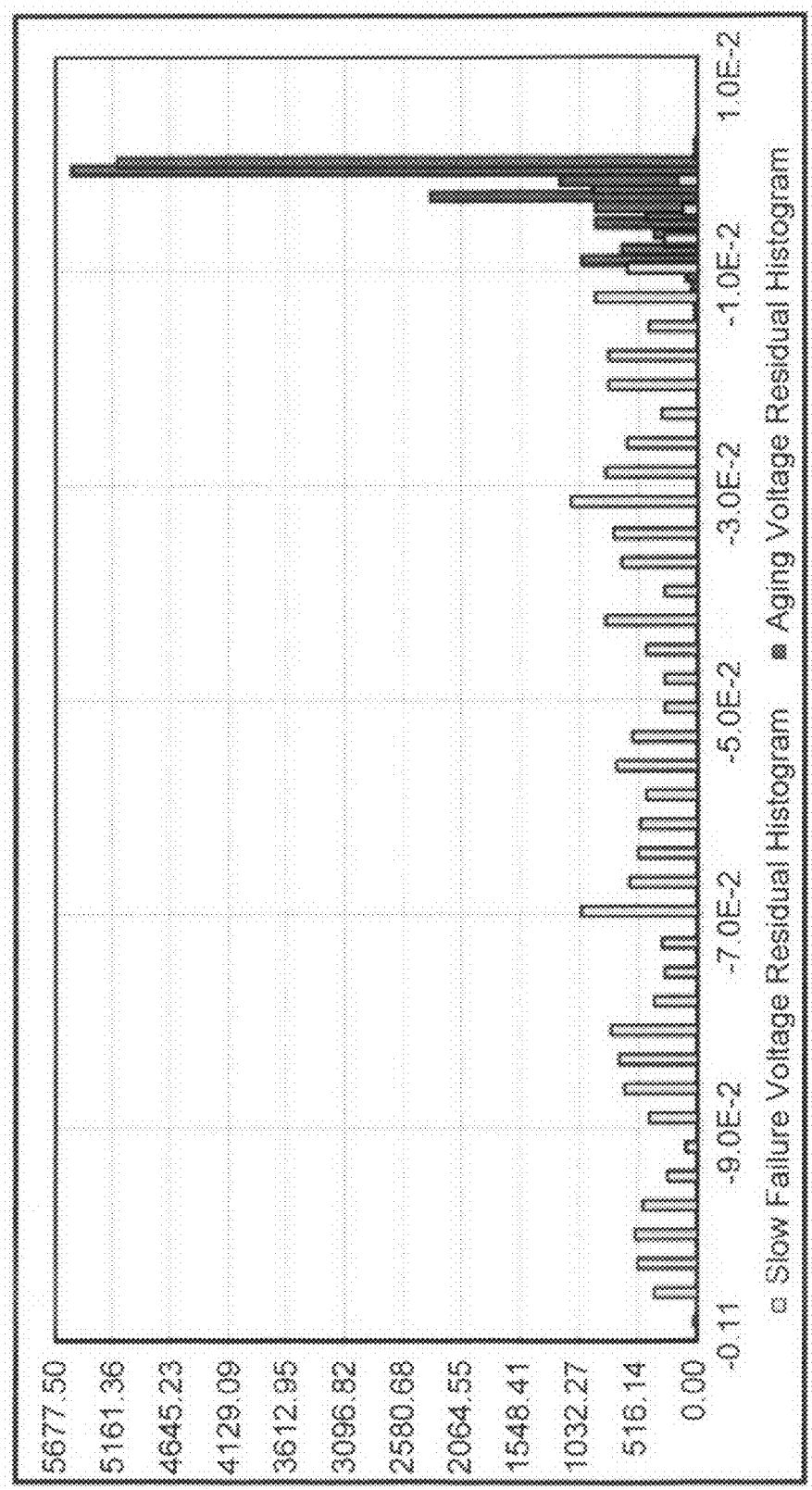
FIG. 27 is a histogram plot of voltage residuals for slow failure data and aging data.
Figure 31:
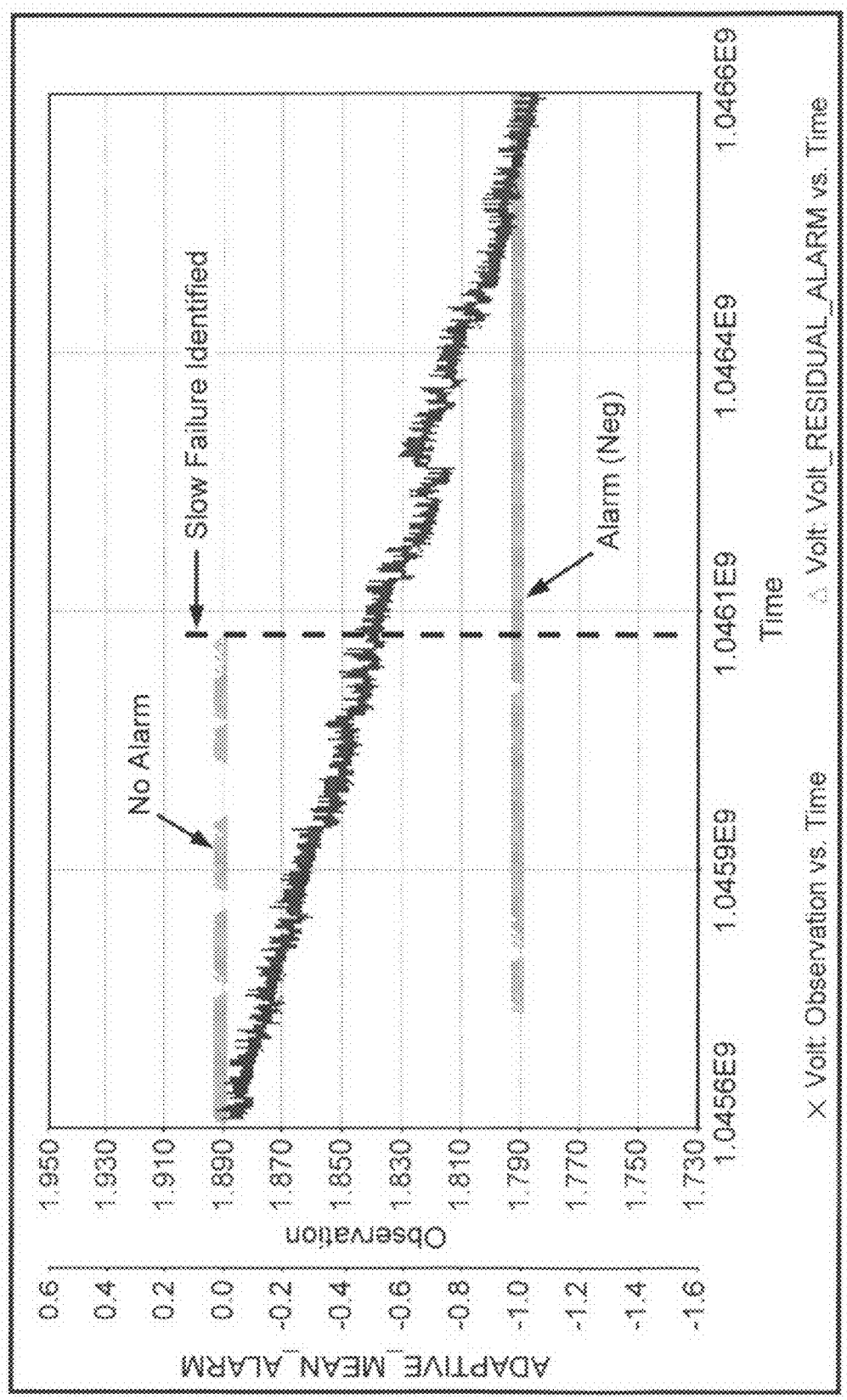
FIG. 31 is a plot of static ASP mean fault detector alarms and voltage data for the slow failure data.
Figure 32:
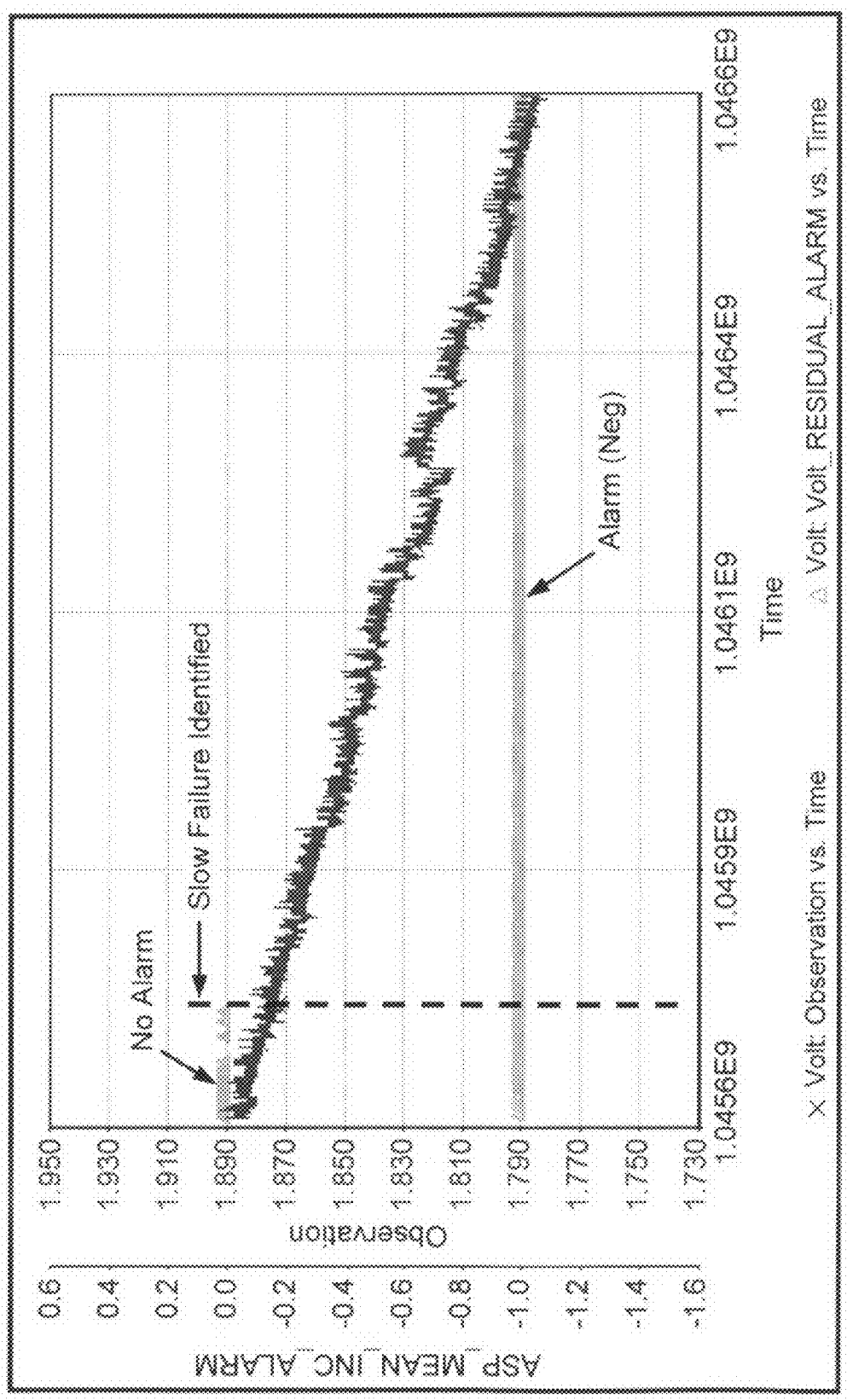
FIG. 32 is a plot of self-calibrating ASP mean fault detector alarms and voltage data for the slow failure data.

The missed alarms for the self-calibrating fault detectors during the slow failure are marked in FIG. 26 as "No Alarm." FIG. 26 demonstrates the ability of the self-calibrating fault detectors to detect the slow failure. FIG. 27 displays the histograms for the aging and slow failure voltage data residuals. The histograms show that the drift applied to the data causes the slow failure residual distribution to shift further to the left and to become more uniform than Gaussian.

FIG. 28 lists the percentage of slow failure data classified properly as faulty by the static fault detectors and by the self-calibrating fault detectors. Faults were reported by the self-calibrating fault detectors for more than 95% of the slow failure data points. In comparison, only 75% of the slow failure data points were reported as faults by the static fault detectors. Ideally, every observation in the slow failure data would be reported as faulty. In reality, however, there exists a period of ambiguity at the beginning of the slow failure data. Referring to FIG. 17, we note that the data is continuous at the point where the data behavior shifts from aging to slow failure. Therefore, the data at the beginning of the slow failure period might possibly belong to the same probability density function as the aging data and is therefore ambiguous.

Data screeners prevent the fault detectors from updating on bad data. The accuracy of the data screeners affects directly whether the fault detector will be allowed to "learn" bad data. Referring to FIG. 29, the number of points rejected by the data screeners is compared for the aging and slow failure periods. As is desirable, nearly all of the slow failure data is rejected by the data screeners.

Aging data is by definition all "good" data, therefore as much of the aging data as possible should be used for updating. The aging data rejected column in FIG. 29 shows that the majority of the aging data is accepted as good data by the data screeners. Slow failure data is mostly bad data, therefore as little of the slow failure data as possible should be used for updating. The slow failure data rejected column in FIG. 29 shows that nearly 99% of the slow failure data is rejected as bad data by the data screeners.

The static ASP mean fault detectors were initialized from the training data and the aging data. The self-calibrating ASP mean fault detectors were initialized from the training data and calibrated dynamically over the aging data. Time of failure detection results were also compared to determine whether the self-calibrating fault detectors would provide more timely detection of an asset fault condition than would the static fault detectors.

Time of failure detection results for the slow failure data are listed in FIG. 30. The units of GMT reported represent the integer format of Greenwich Mean Time. The slow failure identification time is the time at which the fault detector identifies the slow failure consistently, which is indicated by a vertical line in FIG. 31 for the static ASP mean fault detector applied to the voltage residual signal and by a vertical line in FIG. 32 for the self-calibrating ASP mean fault detector applied to the same voltage residual signal. It is apparent from these figures that the self-calibrating fault detectors detect the slow failure condition much sooner than the static fault detectors.

Accordingly, and in one aspect, FIG. 33 illustrates a general flowchart view of an embodiment of a computer-implemented method for self calibrating at least one fault detector monitoring an asset. Additionally, an embodiment of the invention provides a computer-readable medium 144 having computer executable instructions recorded thereon which causes, in use, the computer 140 running the instructions to generally execute a procedure according to the computer-implemented method illustrated in FIG. 33.

Moreover, it should be apparent that numerous modifications and adaptations may be resorted to without departing from the scope and fair meaning of the instant invention as set forth hereinabove and as described herein below by the claims.

We claim:

1. A computer-implemented method for self calibrating at least one fault detector monitoring an asset, comprising the steps of:
   calibrating at least one fault detector with statistics associated with expected asset behavior;
   acquiring observed data values from an asset;
   screening the observed data values based upon at least one defined criterion for obtaining screened data values;
   updating the statistics associated with expected asset behavior as a function of the screened data values for defining updated statistics; and
   recalibrating the at least one fault detector with the updated statistics.

2. The computer-implemented method of claim 1 wherein the at least one defined criterion comprises an indication of a degrading asset condition.

3. The computer-implemented method of claim 1 wherein the updating step comprises a step of utilizing a sequential discounting expectation maximization method.

4. The computer-implemented method of claim 1 further comprising a step of iteratively repeating the acquiring step, the screening step, the updating step, and the recalibrating step for repeatedly recalibrating the at least one fault detector.

5. The computer-implemented method of claim 1 further comprising a step of using the at least one fault detector for determining an indication of an asset fault condition.

6. The computer-implemented method of claim 5 further comprising a step of effecting an alarm action as a function of a determined indication of an asset fault condition.

7. The computer-implemented method of claim 5 further comprising a step of effecting a control action as a function of a determined indication of an asset fault condition.

8. The computer-implemented method of claim 5 further comprising a step of determining an asset fault cause correlative to a determined indication of an asset fault condition.

9. A non-transitory computer readable medium containing computer instructions stored therein for causing a computer processor to perform a self calibrating method, said method comprising:
   calibrating at least one fault detector with statistics associated with expected asset behavior;
   acquiring observed data values from an asset;
   screening the observed data values based upon at least one defined criterion for obtaining screened data values;
   updating the statistics associated with expected asset behavior as a function of the screened data values for defining updated statistics; and
   recalibrating the at least one fault detector with the updated statistics.

10. The non-transitory computer-readable medium of claim 9 wherein the at least one defined criterion comprises an indication of a degrading asset condition.

11. The non-transitory computer-readable medium of claim 9 wherein the updating step comprises a step of utilizing a sequential discounting expectation maximization method.

12. The non-transitory computer-readable medium of claim 9 wherein the method further comprises a step of iteratively repeating the acquiring step, the screening step, the updating step, and the recalibrating step for repeatedly recalibrating the at least one fault detector.

13. The non-transitory computer-readable medium of claim 9 wherein the method further comprises a step of using the at least one fault detector for determining an indication of an asset fault condition.

14. The non-transitory computer-readable medium of claim 13 wherein the method further comprises a step of effecting an alarm action as a function of a determined indication of an asset fault condition.

15. The non-transitory computer-readable medium of claim 13 wherein the method further comprises a step of effecting a control action as a function of a determined indication of an asset fault condition.

16. The non-transitory computer-readable medium of claim 13 wherein the method further comprises a step of determining an asset fault cause correlative to a determined indication of an asset fault condition.

17. An asset surveillance system comprising self-calibrating fault detection, said system comprising:
   at least one fault detector calibrated with statistics associated with expected asset behavior;
   means for acquiring observed data values from an asset;
   means for screening said observed data values based upon at least one defined criterion for obtaining screened data values;
   means for updating said statistics associated with expected asset behavior as a function of said screened data values for defining updated statistics; and
   means for recalibrating said at least one fault detector with said updated statistics.

18. The system of claim 17 wherein said at least one defined criterion comprises an indication of a degrading asset condition.

19. The system of claim 17 wherein said means for updating comprises means for utilizing a sequential discounting expectation maximization method.

20. The system of claim 17 further comprising means for iteratively recalibrating said at least one fault detector.

21. The system of claim 17 further comprising means for using said at least one fault detector for determining an indication of an asset fault condition.

22. The system of claim 21 further comprising means for effecting an alarm action as a function of a determined indication of an asset fault condition.

23. The system of claim 21 further comprising means for effecting a control action as a function of a determined indication of an asset fault condition.

24. The system of claim 21 further comprising means for determining an asset fault cause correlative to a determined indication of an asset fault condition.

* * * * *